United States Patent [19]
Levin et al.

[11] Patent Number: 5,859,981
[45] Date of Patent: Jan. 12, 1999

[54] METHOD FOR DEADLOCK-FREE MESSAGE PASSING IN MIMD SYSTEMS USING ROUTERS AND BUFFERS

[75] Inventors: Vladimir K. Levin; Vjacheslav V. Karatanov; Valerii V. Jalin; Alexandr Titov; Vjacheslav M. Agejev, all of Moscow; Andrei Patrikeev, Chimki; Sergei V. Jablonsky, Moscow; Victor V. Korneev, Moscow; Andrei I. Massalovitch, Moscow; Alexei O. Lacis, Moscow; Alexei V. Zabrodin, Moscow, all of Russian Federation

[73] Assignee: Super P.C., L.L.C., Minnetonka, Minn.

[21] Appl. No.: 678,085

[22] Filed: Jul. 11, 1996

[51] Int. Cl.⁶ .............................. G06F 13/00; G06F 13/28
[52] U.S. Cl. .................. 395/200.68; 395/200.3; 395/200.31; 395/800.1; 395/800.2
[58] Field of Search .......................... 395/200.3, 200.31, 395/200.32, 200.42, 200.61, 800.2, 800.11, 200.68

[56] References Cited

U.S. PATENT DOCUMENTS

| | | |
|---|---|---|
| 4,177,514 | 12/1979 | Rupp . |
| 4,692,861 | 9/1987 | May . |
| 4,783,734 | 11/1988 | May et al. . |
| 4,985,832 | 1/1991 | Grondalski . |
| 5,047,917 | 9/1991 | Athas et al. . |
| 5,058,001 | 10/1991 | Li . |
| 5,101,480 | 3/1992 | Shin et al. . |
| 5,105,424 | 4/1992 | Flaig . |
| 5,113,523 | 5/1992 | Colley et al. . |
| 5,152,000 | 9/1992 | Hillis . |
| 5,168,547 | 12/1992 | Miller et al. . |
| 5,170,393 | 12/1992 | Peterson et al. . |
| 5,243,698 | 9/1993 | May . |
| 5,247,694 | 9/1993 | Dahl . |
| 5,253,342 | 10/1993 | Blount et al. . |
| 5,276,895 | 1/1994 | Grondalski . |
| 5,278,834 | 1/1994 | Mazzola . |
| 5,291,489 | 3/1994 | Morgan et al. . |
| 5,347,450 | 9/1994 | Nugent . |
| 5,367,636 | 11/1994 | Colley . |
| 5,367,692 | 11/1994 | Edelman . |
| 5,444,701 | 8/1995 | Cypher et al. ............................ 370/60 |
| 5,708,836 | 1/1998 | Wllkinson et al. .................. 395/800.2 |

OTHER PUBLICATIONS

David M. Skapura, "Vector links PC/workstation apps", Electronic Engineering Times, p. 64, Oct. 23, 1995.

Herb Edelstein, "The Power of Parallel Database", DBMS, p. D3, Mar. 1995.

Crocket et al, "A MIMD Rendering ALgorithm for Distributed Memory Architectures", IEEE Conference, Oct. 25, 1993.

(List continued on next page.)

*Primary Examiner*—Frank J. Asta
*Assistant Examiner*—Ivan C. Pierce, III
*Attorney, Agent, or Firm*—Patterson & Keough, P.A.

[57] ABSTRACT

A message passing system for an MIMD parallel processing computer system utilizing a CSP programming model is relatively simple and inexpensive, yet allows for deadlock-free message passing, as well as the ability to support irregular connection topologies among nodes in the computer system. Messages are passed from node to node utilizing buffers at intermediate nodes to temporarily store the messages. In accordance with the CSP programming model, the user code is divided into multiple concurrent user processes which communicate with each other via channels. Each user process executing at a node is also provided with a corresponding, but separate, router process which uses a set of N–1 virtual channels to communicate with all other processes in the system, where N is the number of processes. The router process is preferably provided with a routing table that implements an acyclic sub-graph solution for interconnecting nodes in any arbitrary network topology, including irregular network topologies. The router process also allows for standard I/O functions to be emulated at every node in the system, not just those nodes which are directly connected to an I/O device. Preferably, the router process implements a buffer pool management structure which is organized first by channels and then by hops.

21 Claims, 9 Drawing Sheets

OTHER PUBLICATIONS

Yamauchi et al, "PROTON: A Parallel Detailed Router on an MIMD Parallel Machine", IEEE Conference, Nov. 11, 1991.

C.B. Stlinkel, et al. The SP2 High Performance Switch, 34 (2) IBM Systems Journal, pp. 185–204 (1995).

M. Snir, et al., The Communication Software & Parallel Environment of IBM SP2, 34 (2) IBM Systems Journal, pp. 205–221 (1995).

E. Ma, et al., E–Kernal: An Embedding Kernal on the IBM Victor V256 Multiprocessor for Program Mapping & Network Reconfiguration, 5 (9) IEEE Transactions on Paralell & Distributed Systems 977, 994 (1994).

H. Masuyama, Algorithms to Realize an Arbitrary BPC Permution in Chordal Ring Networks & Mesh Connected Networks, E77–D (10) IEICE Trans. Inf. & Sys. 1118–1129 (1994).

Z.J. Czech, et al., Parallel Algorithms for Finding a Suboptimal Fundamental–Cycle Set in a Graph, 19 Parallel Computing 1961–1971 (1993).

HYPER CUBE
FAST BUT COMPLEX

USER-ROUTER COMMUNICATIONS

THE "ROUTER OF NODE" STRUCTURE

THE DEADLOCK-FREE CONNECTIONS

Fig. 10

THE DEADLOCK PROBLEM

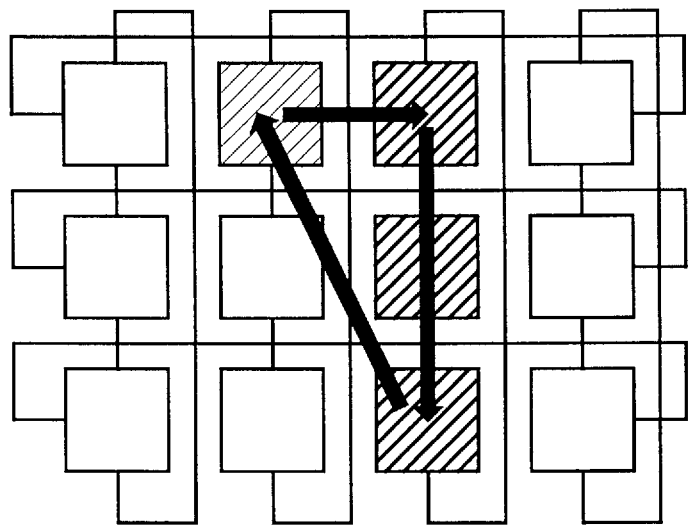

MESSAGE-PASSING OF DIFFERENT NODES CAN CREATE THE "LOOP" OF REQUESTS. ALL NODES IN THE LOOP WILL WAIT EACH OTHER. THEY AREN'T ABLE TO RECOGNISE THE DEADLOCK SITUATION.

Fig. 11

THE SOLUTION

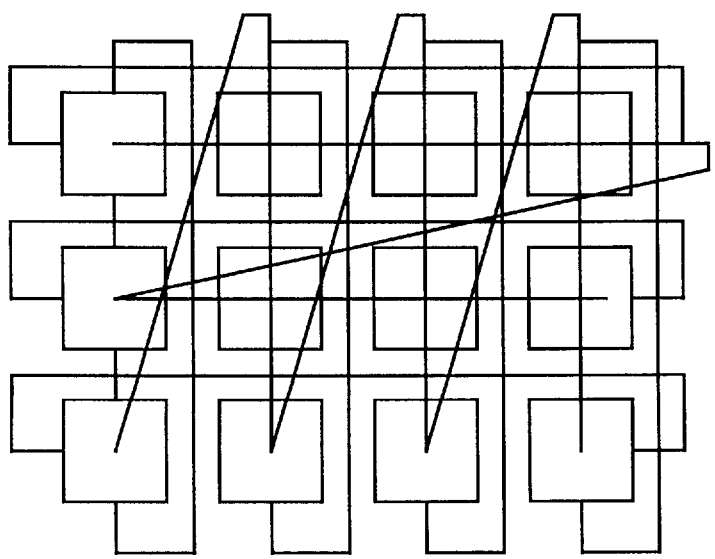

OUR ALGORITHM CREATES OPTIMAL SET OF LOOP-FREE SUBGRAPHS AND, AS THE RESULT, THE DEADLOCK-FREE ROUTING MAP FOR FAST COMMUNICATIONS.

THE STRATEGY OF CREATING DEADLOCK-FREE
SUB-GRAPHS

NOT-DEADLOCK-FREE GRAPH

THE SET OF DEADLOCK-FREE SUBGRAPHS

THE BASIC ELEMENT OF QM-STRUCTURE
QUASI-MATRIX FOR 16 NODES

MAX DIAMETER = 3
(FOR 2D GRID = 6)
NUMBER OF LINKS = 12

THE PROCESSING NODE

THE MULTI-PLATFORM
MULTIMEDIA OPERATING SYSTEM

U-GRAPHIC USER INTERFACE
M-MASTER SCHEDULER
H-ENHANCED NUCLEUS OF OS
B-BASIC NUCLEUS OF OS WITH FAST ROUTER

METHOD FOR DEADLOCK-FREE MESSAGE PASSING IN MIMD SYSTEMS USING ROUTERS AND BUFFERS

RELATED APPLICATIONS

This application is a formal application of a part of the Provisional Application filed on Jul. 12, 1995 and assigned Ser. No. 60/001,072.

FIELD OF THE INVENTION

The present invention relates generally to parallel computer processing systems, and more particularly, to a deadlock-free message passing system for multiple-instruction, multiple-data (MIMD) parallel computer processing systems utilizing a communicating sequential process (CSP) programming model.

BACKGROUND OF THE INVENTION

Parallel computer processing systems are well known and are typically divided into two basic types, single-instruction, multiple-data (SIMD) systems and multiple-instruction, multiple-data (MIMD) systems. SIMD systems use multiple processing elements which are linked together to execute the same instruction on different data points so that the same task is accomplished simultaneously on all of the different data points. A classic example of an SIMD system is an image processing system where multiple processing elements each use the same instructions to simultaneously process different pixel points in an image. MIMD systems also have multiple processing elements which are linked together, but each processing element is executes a different set of instructions on different data values. In this way, a MIMD system can split up different segments of instructions necessary to solve a problem and execute these different segments simultaneously to increase the speed at which the problem is solved.

SIMD systems typically use a central controller to disseminate the single instruction being executed and to coordinate multi-transfer of information among the processing elements. In contrast, MIMD systems use either a shared memory model or message passing model to coordinate the various processing elements and communicate information among them. In the shared memory model, each processing element has access to a common memory used for storing data and control flags which are used to communicate information and coordinate the processing elements. In contrast, each processing element in the message passing model has only its own distributed, local memory and all communication among processing elements occurs via messages passed along a series of connection links between processing elements.

One of the key trade-offs in designing message passing systems for MIMD computer systems is the manner in which processing elements are connected. Obviously, if every processing element is directly and singularly connected to every other processing element, the speed at which messages can be passed is maximized because each message takes only one hop time to move from one processing element to another. The disadvantage with such an all-to-all connection scheme is that, as the number of processing elements increases, the number of connections required grows geometrically and quickly becomes impractical to implement. At the other extreme, if every processing element were connected to one common connection network, such as a single bus, then messages would still take only one hop time to transfer between processing elements, but only one pair of processing elements could communicate with each other at any given time. To solve these connection problems for massively parallel MIMD computer processing systems, having large numbers of message passing processing elements, two general types of connection schemes have been developed: two-dimensional and n-dimensional grid networks.

In a two-dimensional grid network, all of the processing elements or nodes are directly connected in a regular pattern to four other adjacent processing elements (e.g., left, right, up and down), and messages are routed through this message passing network from a sending node to a receiving node by having each node receive messages and, if the message is not for that node, sending the message on to one of the other adjacent nodes. Examples of a two-dimensional grid networks include the Transputer® systems developed by Inmos Ltd, Bristol, England, as described in U.S. Pat. Nos. 4,692,861, 4,783,734 and 5,243,698 and the massively parallel array processing system developed by Digital Equipment Corp., Maynard, Mass., as described in U.S. Pat. Nos. 4,985,832 and 5,276,895.

In an n-dimensional grid network, all of the processing elements or nodes are directly connected in a regular pattern to six or more other processing elements. In essence, an n-dimensional grid network is similar to a two-dimensional grid network, only the number of dimensions in the network has been increased. Examples of n-dimensional grid networks include the hypercube networks developed by nCUBE Corp., Foster City, Calif., as described in U.S. Pat. Nos. 5,113,523 and 5,367,636, and by Thinking Machines Corp., Cambridge, Mass., as described in U.S. Pat. Nos. 5,152,000 and 5,367,692, as well as the hexagonal mesh network developed by the University of Michigan, as described in U.S. Pat. No. 5,101,480.

A popular programming model for message passing networks is the communication sequential process (CSP) programming model which was originally developed by Prof. C. A. R. Hoare. In the CSP model, a software program is divided into independent processes which can exchange data and synchronize their activity via communication links referred to as channels. Each process represents a segment of the software program that can execute independently and of, and generally concurrently with, other segments of the program. Each channel serves as a communication path by which information and data are exchanged between processes. To insure synchronization of processes, transmissions are always acknowledged by the receiving process and the sending process always waits to receive this acknowledgement. Concurrent processing in the ANSI C programming language, for example, conforms to the CSP programming model.

One of the more difficult problems in managing CSP inter-process communications for a message passing MIMD computer processing systems is preventing deadlocks. Deadlocks are situations where the passing of messages among the various process stops because some or all of the processes are endlessly waiting or blocked. In networks where messages are passed from one node to the next on their way from a source node to a destination node, the messages may be temporarily stored in a buffer of an intermediate node during the message passing process. In this situation, deadlocks can occur because one or more of the intermediate nodes will have only a limited buffer space available for the temporary storage of information passing by that node on its way to another node. If the buffers in adjacent nodes fill up, for example, then no messages can be sent to unload the buffer in the center node and a deadlock situation is created. By analogy, a deadlock is somewhat like a traffic gridlock across a series of traffic intersections where cars in one intersection cannot move forward because there is no room in any of the adjacent intersections.

Two techniques have been used, in an effort to decrease or prevent deadlocks when managing CSP inter-process communications. First, the message passage networks are designed with regular interconnections between nodes. The regularity of the interconnections makes it easier to anticipate deadlock conditions and easier to accommodate deadlock conditions by using information that is known about the structure of the network and contained, for example, within the address of a message to help in preventing deadlock conditions. Second, the routing algorithms used in the message passage networks are usually designed to implement adaptive routing, rather than oblivious routing. Oblivious routing implies that, when a message directed to a destination node B, for example, arrives at an intermediate node A, that message is always routed to intermediate node C, regardless of the "traffic" conditions associated with node C. Adaptive routing, on the other hand, allows intermediate node A to check on the "traffic" conditions at the next intermediate node C, and, if the conditions are not good, select an alternate intermediate node for routing the message to destination node B. An example of an adaptive routing message passing system is shown in U.S. Pat. No. 5,170,393.

While the use of regular interconnections and adaptive routing can effectively handle most deadlock situations in message passing networks that utilize intermediate buffers, the use of these two techniques is not without a performance penalty. Specifically, the requirement for regular interconnections necessarily increases the number of inter-node hops, for example, which must be made to pass a message from one side of a network to another, particularly in a 2-dimensional grid network. The use of adaptive routing necessarily increases the overhead associated with the routing algorithms, and hence decreases the overall message passing performance of the network.

Other attempts have been made to provide interprocessor switching networks that solve the deadlock problem. The use of control circuitry as part of a regularly-structured message passing network is described in U.S. Pat. Nos. 5,058,001, 5,105,424 and 5,291,489. The problem of deadlocks in an irregularly connected MIMD computer processing system is described in U.S. Pat. No. 4,177,514, which proposes a separate, decentralized control network connected from multiple control nodes to multiple processing nodes to solve the deadlock problem. In U.S. Pat. No. 5,347,450, router circuitry in each node for a network switched communication path between a source node and a destination node, thereby eliminating the need for any intermediate buffers in the message passing network. Unfortunately, these types of hardware and control solutions only complicate and limit what is otherwise a very simple inter-process communication architecture for the CSP programming model.

A different attempt to increase the performance of message passing networks is proposed in U.S. Pat. No. 5,247,694. In this patent, a problem graph is created to represent the various processes that comprise a given software program. The problem graph is then used to aid in assigning processes to processing nodes so as to optimize communications among the processing nodes of a regularly connected hypercube network for the given software program. In essence, this solution optimizes the way in which the software program is divided so as to avoid deadlocks when executing that particular program, rather than altering the message passing network so as to prevent the occurrence of deadlocks in the first place.

While existing techniques for providing message passing networks in a MIMD computer processing system offer many advantages over other types of parallel processing computer systems, it would be advantageous to provide a simple message passing system for a MIMD computer processing system which could provide enhanced message passing performance, yet avoid the deadlock problem.

SUMMARY OF THE INVENTION

The present invention provides for a message passing system for an MIMD parallel processing computer system utilizing a CSP programming model that is relatively simple and inexpensive, yet allows for deadlock-free message passing, as well as the ability to support irregular connection topologies among nodes in the computer system. Messages are passed from node to node utilizing buffers at intermediate nodes to temporarily store the messages. In accordance with the CSP programming model, the user code is divided into multiple concurrent user processes which communicate with each other via channels. Each user process executing at a node is also provided with a corresponding, but separate, router process which uses a set of N−1 virtual channels to communicate with all other processes in the system, where N is the number of processes. The router process is preferably provided with a routing table that preferably implements an acyclic sub-graph solution for interconnecting nodes in any arbitrary network topology, including irregular network topologies. The router process also allows for standard I/O functions to be emulated at every node in the system, not just those nodes which are directly connected to an I/O device. Preferably, the router process implements a buffer pool management structure which is organized first by channels and then by hops.

The advantages produced by the present invention include the ability to implement a true CSP multi-processor programming model without deadlocks using relatively inexpensive processing circuitry at each node without the use of complicated routing circuitry. Additionally, the ability of the present invention to support irregular connection topologies enables the use of a quasi-matrix 2-D connection network which has no more than four connections per node, but which has a maximum network dimension which more closely matches an N-dimensional hypercube network. This significantly increases the speed at which messages are passed in the message passing system of the present invention as compared to a regular 2-D connection network. As such, the overall price-performance metrics of an MIMD parallel processing computer system implemented using the present invention are improved as compared to the price-performance metrics of existing MIMD message passing networks.

BRIEF DESCRIPTION OF THE DRAWINGS

FIG. 10 is a block diagram of the 2-D grid connection network of FIG. 1 showing a looping deadlock situation of a prior art message passing network.

FIG. 11 is a block diagram of the 2-D grid connection network of FIG. 1 showing a set of loop-free subgraph message passing in accordance with the present invention.

DETAILED DESCRIPTION OF THE INVENTION

The present invention is specifically directed to a message passing MIMD computer processing system. Familiarity with the basic concepts of parallel processing and with the particular characteristics of message passing MIMD computer processing systems is helpful in understanding the present invention. For a general background in parallel processing computer systems, reference is made to Baron, R and Higbie, L., *Computer Architecture*, Addison-Wessley Publ. (1992) Chpt. 7. Throughout the detailed description of the invention, the first time a term is used in describing the message passing system of the present invention, that term will be capitalized for easy reference.

In describing the present invention, a background of the hardware and software of a typical message passing system will be presented first to describe how elements within the system are related. The basics of the preferred programming model for use with the present invention are then described. The programming model describes a model of how a programmer views the computer processing system that will dictate how the user's software program should be programmed in order to run on a particular system. Next, a review of existing message passing systems is presented. With this background in mind, the way in which the present invention improves on existing message passing MIMD computer processing systems will then be described. Finally, additional improvements directed to the unique problems of deadlocks and irregular connection networks are described.

BACKGROUND
Existing Hardware Connections for Message Passing Systems

Figure 1:
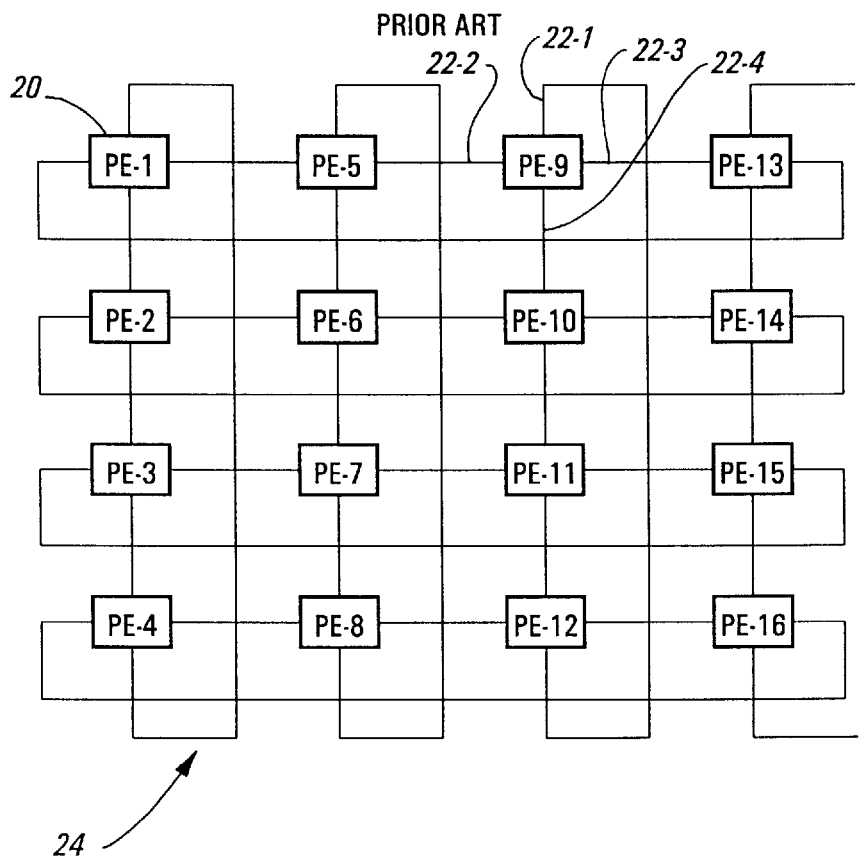
FIG. 1 is a simplified block diagram of a prior art 2-D grid connection network for a MIMD computer processing system.
Figure 2:
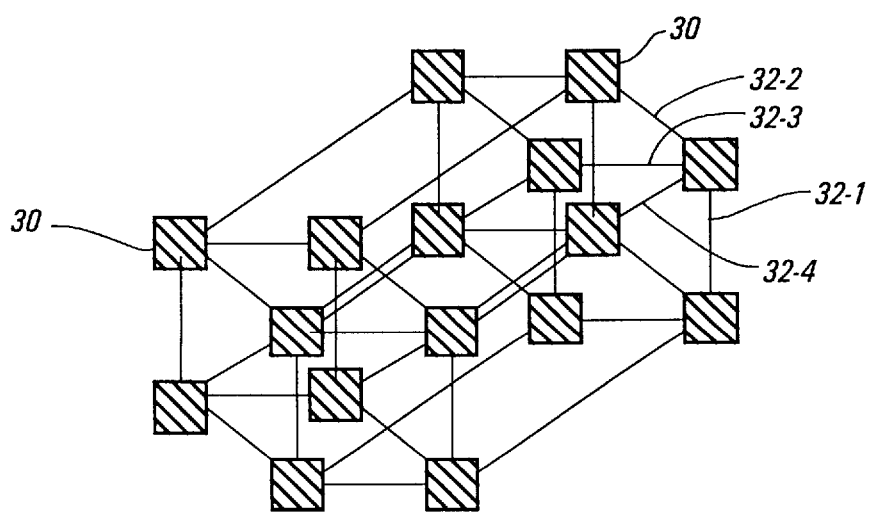
FIG. 2 is a simplified block diagram of a prior art hypercube grid connection network for a MIMD computer processing system.

Referring now to FIGS. 1 and 2, two different examples of the hardware connection networks for message passing systems are shown. In FIG. 1, PROCESSING ELEMENTS (PEs) 20 are each connected by four bi-directional CONNECTIONS 22-1, 22-2, 22-3 and 22-4 to four adjacent processing elements 20 so as to form a 2-D grid CONNECTION NETWORK 24. In FIG. 2, processing elements 30 are each connected by eight bidirectional connections 32-1, 32-2, 32-3, and 32-4 to four other processing elements 30 (one processing element in each of four different dimensions or directions) so as to form a hypercube connection network 34.

It can be seen that connection networks 24 and 34 are both formed of regularly patterned combinations of processing elements 20, 30 and connections 22, 32, respectively. It can also be seen that for processing element PE-1, for example, to communicate with processing element PE-7, some form of message passing must occur along intermediate processing elements because there is no direct connection link between nodes PE-1 and PE-7. In the 2-D grid connection network 24, the intermediate processing elements might be PE-2 and PE-3, for example, in which case the message passing is referred to as requiring three HOPS, e.g. from PE-1 to PE-2, from PE-2 to PE-3, and from PE-3 to PE-7. In the hypercube connection network 34, only one intermediate processing element, PE-2 for example, would be necessary to go from PE-1 to PE-7, in which case the message passing requires only two hops, e.g., PE-1 to PE-2 and PE-2 to PE-7.

Existing Software Connections for Message Passing Systems

Figure 3:
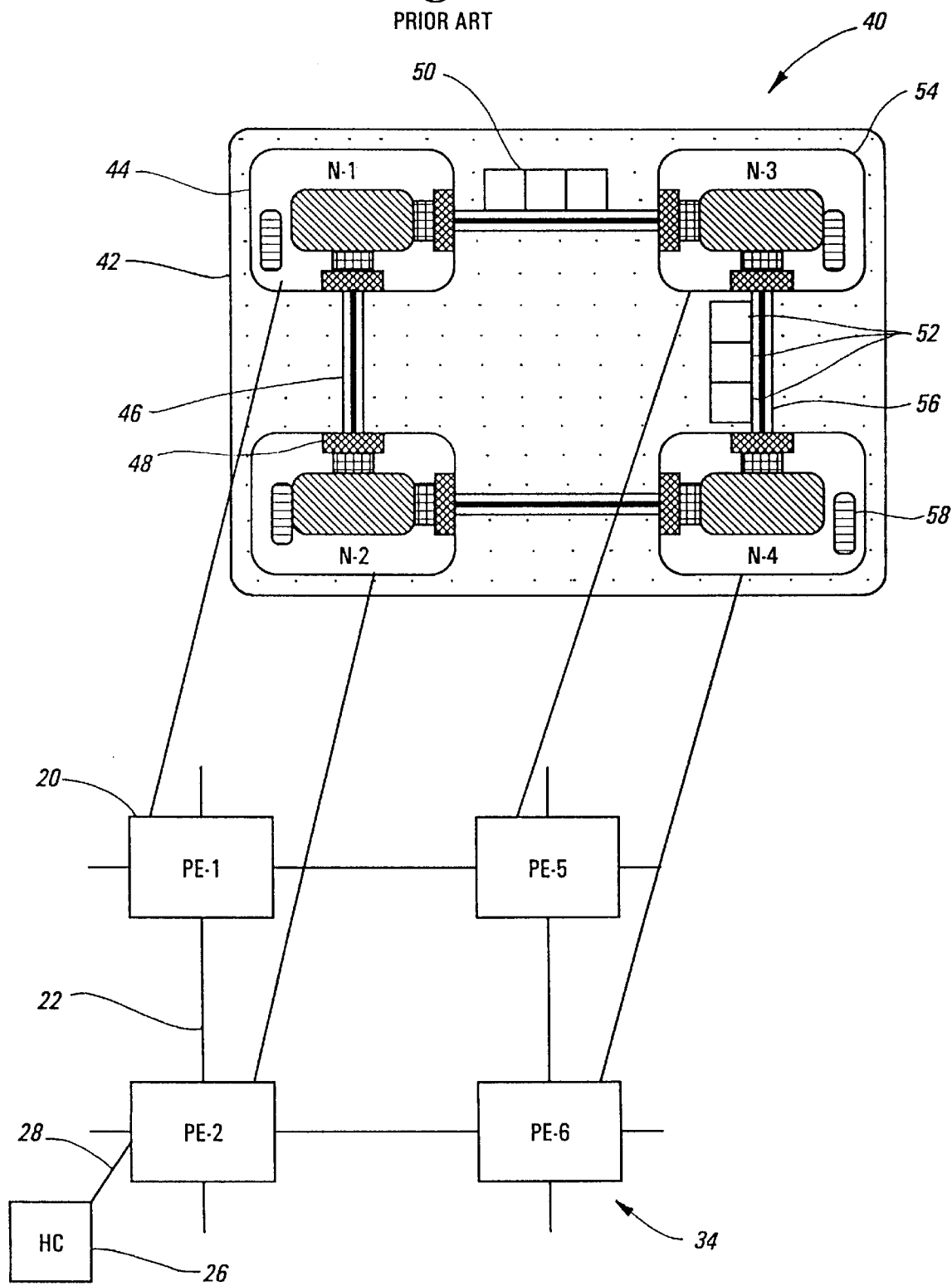
FIG. 3 is a simplified block diagram of a prior art message passing system.

With this basic understanding of the hardware involved in a typical message passing MIMD computer processing system, FIG. 3 shows how a part of a 2-D grid connection network 24 of FIG. 1 to demonstrate how a typical message passing system 40 operates. In this example, it is assumed that a USER PROGRAM 42 has been divided into a number of parts, and that each part of the user program is loaded into a different processing element 20 to be executed. Each part of the user program 42 that well be executing on a different processing element 20 is referred to as a NODE 44 in the message passing system 40. Individual nodes 44 are identified by unique NODE NUMBERS, which are unique throughout the message passing system 40. Nodes 44 communicate with one another by way of links 46 defined between nodes 44.

In FIG. 3, each of the nodes 44 is shown as being loaded into a unique processing element 22 (as indicated by the dashed lines). It should be understood that, as used within the present invention, a node 44 and a processing element 20 are not directly corresponding components of a message passing system 40. Neither are a link 46 and a connection 22. As will be described in connection with the discussion of the CSP programming model, it is possible for multiple nodes 44 to be implemented on the same processing element 20, in which case some of the links 46 from a given node 44 will be physical links in the form of connections 22 and others of the links 46 from the given node 44 will be in the form of virtual channels, as will be described. This added level of abstraction is sometimes difficult to grasp upon an initial reading and it is recommended that, until a reader is familiar with the concepts of nodes and links as part of the CSP programming model which will be described, it is easiest to understand the present invention by assuming that nodes 44 and links 46 have a one-to-one correspondence with processing elements 20 and connections 22, respectively.

There are two basic assumptions about communications among nodes 44. First, any node, N–1, (the SOURCE) may send a MESSAGE 50 of arbitrary length to any other node, N–4, (the DESTINATION), and it is guaranteed that node N–4 will consume message 50 in some finite time. The logic to provide for this unconditional consumption may be quite different from one message passing system to the next, however, it is assumed that unconditional consumption exists. Second, all of the nodes 44 will have a limited amount of space in an INTERMEDIATE BUFFER 48 for the temporary storage of messages 50 passing by a given node, N–2, (the INTERMEDIATE NODE) that are directed to some other destination node, node N–4, for example. This limited amount of buffer space means that a message 50 may be divided, for the purpose of transfer, into multiple PACKAGES 52 of limited size, to ensure that any package 52 may be stored in a single intermediate buffer 48.

The process of transferring messages 50 comprised of multiple packages 52 between nodes 44 is referred to as a routing scheme. Just as the hardware connections 22 which interconnect processing elements 20 into a particular connection network 24 may differ, so too may the routing schemes which control the passing of messages 50 between nodes 44 via links 46. When messages 50 are divided into packages 52, a message passing system 40 may implement either a STORE AND FORWARD routing scheme or a WORMHOLE routing scheme. The store and forward routing schemes imply that the information about the destination node number is included into each package 52. In fact, each package 52 may be routed separately as if it were a complete message 50. With the wormhole routing, only the first package 52 of a message 50 carries routing information, such as the destination node number. This implies that when such first package 52 of a message 50 is passed through an intermediate node 44, a temporary "worm hole" appears between the incoming and outgoing links 46, which passes all the packages 52 of a message 50 till the end is encountered. All other messages 50 that want to be directed to the same outgoing link 46 are blocked until the first message 50 which created the worm hole is completely transferred through the intermediate node 44.

The advantage of the store and forward scheme is the ability of the intermediate nodes 44 to interleave packages 52 from different messages 50 to keep as many of the links 46 as busy as possible. When the wormhole routing scheme is used, some links 46 may be waiting for work, even though there is work for them to do, because the packages 52 can not arrive due to the fact that the first package 52 containing the routing information is blocked somewhere else in the message passing system 40.

In order to understand the disadvantages of the store and forward routing scheme as compared to the wormhole routing scheme, it is necessary to introduce several more terms: the EFFECTIVE SPEED of the message passing, the LATENCY and PIPELINING. It is clear that with both schemes the transfer of messages 50 through the intermediate nodes 44 is pipelined. While the first package 52 of a message 50 has reached the destination node 44, the last package 52 may have not yet been left the source node 44, and the intermediate packages 52 are moving simultaneously, because they are passed through the different links 46 and buffers 48. In theory this means that the effective speed of transfer may be almost as large as the speed of transfer between adjacent nodes, connected directly. The larger the number of hops between the source and destination, the more connections work simultaneously on the same message 50. In practice, however, this theoretical speed is not achieved.

If the transfer time is compared between adjacent and non-adjacent nodes 44 for either routing scheme, there is at least one source of delay in the latter case: the time of delivery of the first package 52 from the source to the destination, the so-called latency time. If the packages 52 are very small, the latency time decreases because it takes less time to transfer the packages 52 from source to destination. But, the smaller the packages 52 are, the larger is the fraction of the package 52 occupied by the addressing information. Let the size of the addressing information be, for example, 8 bytes. With packages 52 having bodies only 8 bytes long, for example, the store and forward router will decrease the effective speed twice in comparison with the real media speed, because each package 52 will be only half occupied with the useful information as the other half of each package 52 is the address. Thus, while a decrease of the package length minimizes the latency with the store and forward scheme, it does so at the cost of effective speed. The wormhole scheme is free of this disadvantage.

Both routing schemes suffer from a speed decrease as compared to the theoretical speed because of the limited startup time of the media. The time of physical link transfer may be defined as:

$$k*n+b, \qquad \text{(Eq. 1)}$$

where k is the transfer rate, n is the length of a message and b is the startup time independent of the length n. The shorter the packages 52 are, the more there is a difference between the effective speed and the transfer rate. This is because there are more "b"'s from Eq. (1) are included in the transfer time. It should be noted that the "b" value depends fully upon the hardware implantation of the particular processor elements 20 and connections 22, for example, which comprise each node 44 and link 46.

With extremely reactive intermediate nodes 44, i.e. nodes with very low "b" values, the wormhole scheme is preferable, because it allows decomposition of messages 50 into very small packages 52 without the loss of the overall speed. With nodes 44 having larger "b" values, the necessity to preserve high effective speed prevents making packages 52 very short, and thus the store and forward routing is preferable, because it allows message interleaving, thereby putting potentially more links 46 to simultaneous work. Another factor in choosing the routing technique to be used in a message passing system is the size of the message passing system 40 in terms of the number of nodes 44 in the system, because with larger systems 40 the inability to interleave messages under the wormhole scheme can lead to potentially to more traffic jams or deadlocks.

The message passing system of the present invention is applicable to either a store and forward routing scheme or a wormhole routing scheme, and the choice of which routing scheme to utilize can be established independent of the implementation of the present invention.

PROGRAMMING MODEL

CSP Channel Communications

In the preferred embodiment of the present invention, the processing element 22 for each node 44 will implement in hardware a channel communication scheme known as Hoare's Communicating Sequential Processes (CSP) model. In the CSP programming model, a software program consists of multiple PROCESSES 54 connected by CHANNELS 56. A process 54 is a set of computer instructions which can execute separately from other sets of computer instructions in the software program. A channel 56 is a point-to-point synchronous connection between a pair of processes which can perform two operations: (a) send n bytes, and (b) receive n bytes. As shown in FIG. 3, in the prior art, each process 54 in the CSP programming model is uniquely associated with a particular node 44 and each pair of channels 56 is uniquely associated with a particular link 46 such that there is a one-to-one correspondence.

In the CSP programming model, processes 54 communicate as follows: When a process A sends n bytes to the channel connecting it to the process B, process A stops until process B receives n bytes from the other end of the channel. The behavior of process B is similar. The communication between process A and process B may start in any order, but the communication will end only when A has sent, B has read and the transfer is physically over. During the period of the transfer, the process that communicates is inactive. A reading process may query if the channel it wants to read from is ready to transfer something. The writing process may only start writing and thus stay idle until the message is read from the opposite end of the channel. Generally, the length of the messages sent and received by one operation have to coincide, though in some cases it is possible to send 50 bytes twice and receive 100 bytes once, for example.

The "send" and "receive" operations which implement the channel transfer are preferably part of the instruction set of processing element 20, and, in simple programming environments, these instructions are supplied to application programmers just as they are provided in the hardware. From the CSP scheme point of view, a link 46 is just a channel pair, a pair of channels 56 in opposite directions. Preferably, links 46 are physically independent, with each link 46 being guarded by a separate direct memory access (DMA) link engine implemented in the hardware of the processing element 20. The "send to link" and "receive from link" operations are preferably processor instructions which may be issued by processes 54.

The most obvious example of a link 46 in the form of a real physical channel between processes is a connection 22 between two processing elements 20. Alternatively, it is possible to implement a link 46 within the memory of a processing element 20 so as to provide for a virtual channel 56 that can be utilized by two different processes 54, i.e., virtual nodes 44, executing on the same processing element 20. This type of scenario might be used, for example, in a situation where the number of processes in a user program 42 is greater than the number of processing elements 20 within the connection network 24, in which case processes 54 will be mapped onto both physical and virtual nodes 44 and channels 56 will be mapped onto both physical and virtual links 46.

To implement virtual nodes 44 and virtual channels 46 within a message passing system 40, it is necessary for the preferred embodiment of processing element 20 to have a hardware-implemented process scheduler. A single processing element 20 may execute a theoretically unlimited number of concurrent processes 54 by using a fair timer-based scheduling with very fast context switching (an order of time of 10–20 instructions per one context change). The processes 54 may be coded as occupying different memory areas within the processing element 20 and, in this case, they are truly concurrent CSP processes 54 that may be connected by virtual channels 56.

Inter-process communication in a CSP manner may occur either between processes 54 executing in different processing element 20 and connected by physical connections 22, or between processes 54 in virtual nodes 44 executing in the same processing element 20 and connected by virtual links 46. Preferably, this difference is transparent to the programmer as channel communication are implemented in a unified manner at the hardware level of the processing element 20.

In the preferred embodiment of the present invention as will be described, the processing element 20 may organize as many channels as required for arbitrary interconnection of the processes inside the same processing element 20, and the same instructions are used to send/receive messages between the processes inside the same processing element 20 and between the processes in the adjacent processing elements 20 connected by connections 22. Technically this is achieved via the difference in the value of the instruction operand for the send/receive instructions. Each channel end in a node is guarded by a CHANNEL CONTROL WORD, the address of which is an operand of a send/receive instruction of the processing element 20. Some reserved words in memory are hardwired to be the control words of external links. Other words, if previously assigned a special initializing value, may serve a control word for a virtual link inside a node.

CSP Programming Model

The unification of the notions of "channel" and "process" leads to several non-trivial consequences in the style of CSP programming for a message passing system 40.

First of all, the strict CSP style of programming should be fairly well supported by the hardware of the processing element 20, and need only limited software support. Indeed, a true "CSP-style" program is a couple of processes 54 that share no common data, but are connected by channels 56 for purposes of synchronization. The second consequence regarding the CSP style of programming is not so obvious and is more interesting for the system programmers. The communication of processes 54 inside the same processing element 20 via the CSP primitives is not just "one more" facility of asynchronous programming. It is the only facility. There is no such notions as "interrupt", "asynchronous event", etc. in the CSP programming model. So, inside the asynchronous system components, when some sort of "event-handling" behavior should be implemented, the system programmer is forced to use channel communications instead of interrupts, etc. The processes 54 may be very tightly coupled by shared data structures, but they still communicate via channels 56 for the purpose of synchronization.

In the CSP programming model, the concept of placement of processes 54 on nodes 44 and channels 56 on links 46 in the form of either connections 22 (for external channels) or memory locations (for internal/virtual channels) implies some mechanism for passing parameters about the way in which the user code has been organized and divided to the process code unit for each process at run-time. This mechanism is referred to as the CONFIGURATION DESCRIPTION. At the time the user code is compiled and linked, units of process code 54, each of which implements some process and all of which are treated as independent "black boxes", are assigned to a node 44 and are connected by channels 56 to the other processes 54. When this "black box" starts its execution, the user process 54 has to pull from somewhere the information about the channels 56 it possesses, and, perhaps, some other application-dependent information. Such information is presented in the configuration description in a so-called PROCESS INTERFACE (or IMPORT) LIST 58, and is available for the user process 54 through a special library function on a parameter-number basis. For example, the user code may query the address of the import number 7 and, knowing that it must be a channel, input from it. Other functions of a system library for a CSP programming model will include functions: to input/output from/to a channel, to query channel ready to input, to start a process dynamically on the same processor, to perform semaphore/signal functions and so on.

EXISTING CSP MESSAGE PASSING SYSTEMS

The Inmos Transputer® System

One example of an existing system which implements the CSP programming model is the Inmos Transputer® system available from Inmos, Ltd., Bristol, England. In the Inmos Transputer® system, each processing element 20 is implemented using an Inmos Transputer® having four internode connections 22 and the network connection 24 is constructed as shown in FIG. 1. The Inmos Transputer® system is usually thought of as a message passing system that generally has no peripheral equipment besides the connection links. In practice, one connection 22 of the network 24 is connected to a HOST COMPUTER 26, which is a general-purpose computer, most often an IBM® PC-compatible computer. The host computer 26 is provided with a special board which carries a LINK ADAPTER 28. Special hardware is added to the host computer 26 to reset the network 24 programmatically to initial state, from which all of the processing elements 20 in the network 24 may be BOOTED via the link adapter 28.

Up to this point, an overview of the general requirements of a particular software model, CSP, have been described. There are a number of software toolsets which have been created to implement the CSP programming model. One of the most popular software toolsets for the CSP programming model is the Inmos C Toolset for the Inmos Transputer® system, as described in ANSI C Toolset-User Manual, INMOS Ltd, Doc. No. 72 TDS 224 00 (August 1990).

In the Inmos C Toolset, a simplified operating system is provided, referred to below as a TOOLSET OS, which has no resident code, no command monitor code and no resource management code which exists as a process separate and distinct from the process which is the user code. In the Inmos C Toolset, a single executable file is booted on the Transputer® system from the host computer 26, which contains a user code collected together with a "single-use" operating system that together comprise the process 54 which is to be loaded onto a node 44. The Toolset OS services any system requests of the user code while the user code is executing and dies with the user code when the user code terminates. The next executable file booted in the Transputer® system will also contains a single-use OS in itself, and so on.

While the booted user code is executing, the user code may issue some I/O requests to the host peripherals. These requests are received and served by a host program, the HOST FILE SERVER, executing on the host computer 26 which boots the user code program and remains active until the booted code reports end of work. So, in the lifetime of the user code program, the host computer 26 essentially serves as just an "intellectual peripheral station" of the Transputer® system.

The development tools for the Inmos C Toolset include the following components: the C compiler, the linker, the configuration description compiler to compile the placement description for the compiled and linked units, and the collector to execute the compiled configuration description. The result of the execution of the compiled configuration description is a collected bootable file of the user program, directly bootable and serviceable by the host file server. In addition to these components, all of which should be familiar to a programmer skilled in the art of CSP programming, the Inmos C Toolset includes an IMPORT facility and a system library to use the process/channel primitives.

While the Inmos C Toolset implements most of Hoare's CSP programming model, one notable disadvantage limits the practical effectiveness of the Inmos C Toolset. Because each channel 56 must complete an entire transfer before the process 54 which initiated the channel 56 can release, no more than one channel 56 between two processes 54 residing on different processing elements may be in use at any one time in the Inmos C Toolset. In other words, the process 54 executing on a node 44 becomes completely bound to whatever channel 56 it has presently initiated on a given link 46. As a result, the functions required of an intermediate node 44, namely to pass messages 50 on to an adjacent node 44, cannot effectively be executed in the "background" while execution of the process 54 for the intermediate node 44 which needs to initiate a second channel 56 to a different adjacent node 44 is simultaneously occurring in the "foreground".

I/O Functions for Prior Art CSP Systems

There is a severe limitation in the Posix I/O functions (open file, printf, . . . ). Only a process connected to a host link adapter 28 by a channel pair may call such functions, other processes are restricted to the transputer-specific features. This obviously present a severe limitation to the programmer in designing the user code.

THE PRESENT INVENTION

Although the Inmos C toolset provides many of the features which are needed to fully implement the CSP programming model, the present invention adds several software-implemented facilities to broaden the application of the CSP programming model and to improve the execution and operational performance of user programs executed under the CSP programming model in accordance with the present invention.

Figure 4:
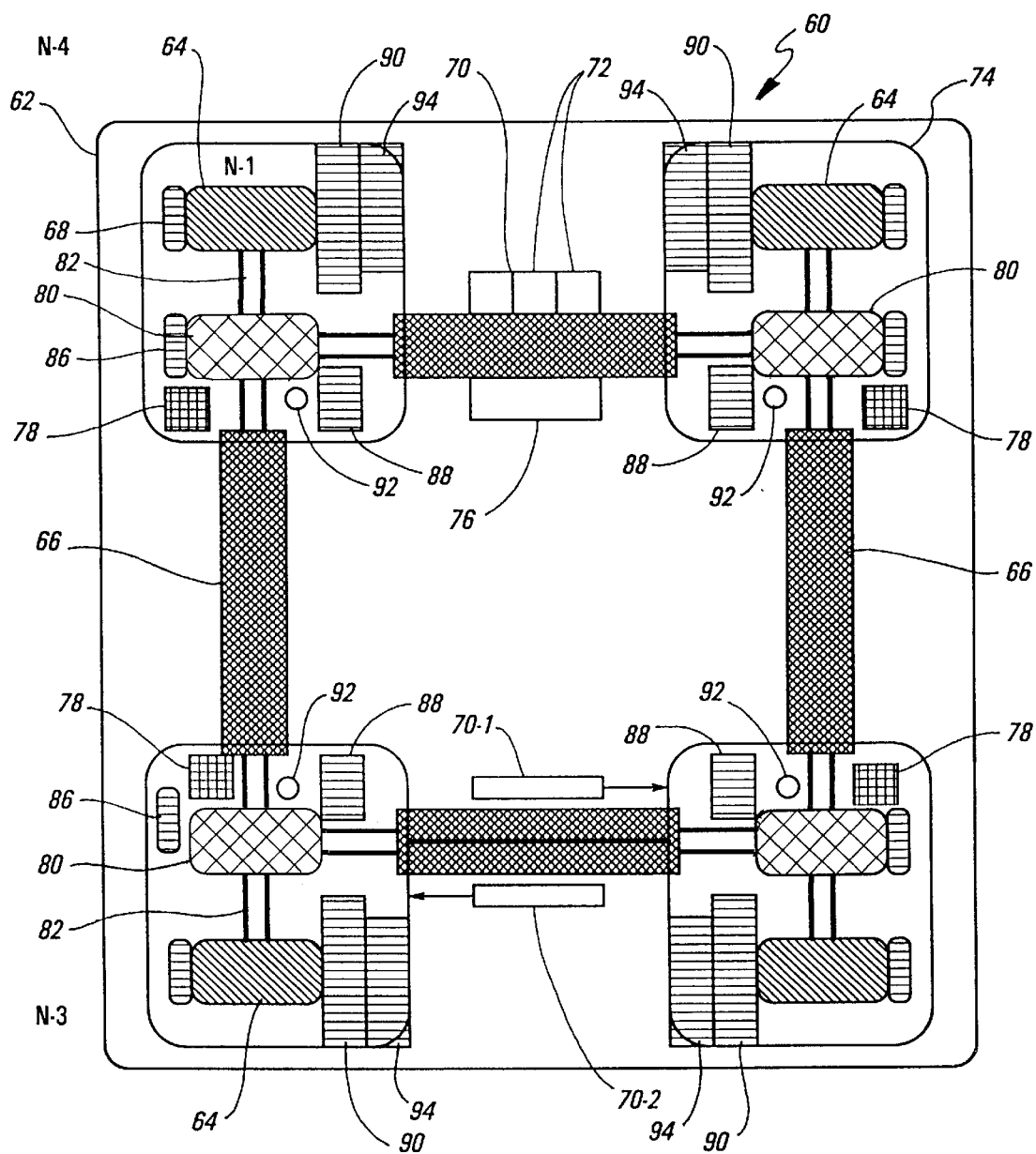
FIG. 4 is a simplified block diagram of a message passing system in accordance with the present invention.
Figure 7:
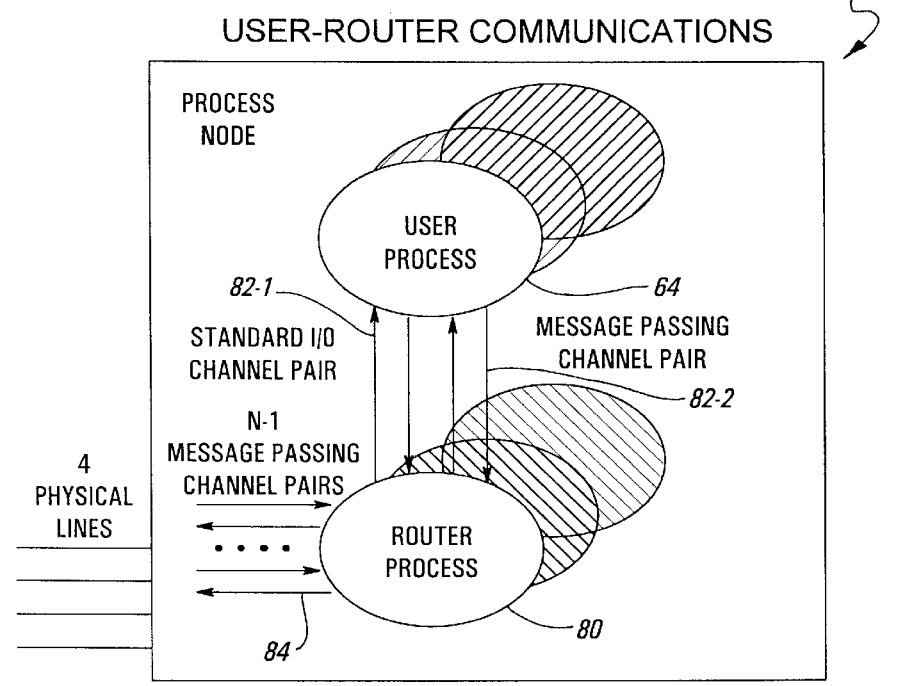
FIG. 7 is a block diagram of processes in an individual processing node in accordance with the message passing network of the present invention.

As shown in FIGS. 4 and 7, the present invention accomplishes these objectives by utilizing a message passing system 60 for a user program 62 comprised of a plurality of user processes 64 logically connected by channels 66 which are mapped onto a plurality processing nodes 74 and a set of transfer links 76 according to a user configuration list 68 for communicating a message 70 of arbitrary length and preferably comprised of multiple packages 72 from one user process 64 to another user process 64 identified by a destination node number. Although the physical processing elements and connections are not represented in FIG. 4, it should be understood that the nodes 74 are mapped onto physical processing elements and transfer links 76 are mapped onto physical connections or virtual channels defined in memory in the same way in which nodes 44 and links 46 are mapped onto processing elements 20 and connections 22 or virtual channels as described with respect to FIG. 3.

Unlike the prior art message passing system 40, the message passing system 60 of the present invention also creates a unique ROUTER PROCESS 80 that will execute on the same processing node 74 as the user process 64 during compilation of the user process 64. Each user process 64 and its' associated router process 80 are connected by defining in the memory of the processing node 74 at least one communication channel 82 between the user process 64 and the associated router process 80. For each router process 80, an array of N−1 TRANSFER CHANNELS 84, each of which is correlated to the set of transfer links 76 of the processing node 74, is defined in the memory of processing node 74. A ROUTING TABLE 86 is also created in the memory of processing node 74 unique to that processing node 74 for mapping a destination node number to a particular transfer channel 84. During execution of the user processes 64, messages 70 are passed within the message passing system 60 by having a routing process 80 at each processing node 74 route messages 70 received by that processing node 74 in response to a destination node number contained in the message 70 and the routing table 86 unique to that processing node 74.

Several advantages are derived from the manner in which the message passing system 60 is preferably implemented.

First, the message passing system 60 of the present invention implements transfers of messages 70 without requiring that a user process 64 wait for the transfer operation to complete. Transferring while doing some other job at the same time is a fundamental feature of good parallel processing systems. The implementation of this feature by the user of the router processes 80 and the routing table 86 solves the problems of how existing message passing systems 40 have implemented the assumption in the CSP programming model that a message must be guaranteed to be consumed.

Second, the message passing system 60 of the present invention implements a low startup time as the fundamental criteria for optimization of the operation of the message passing system. The criteria of optimization for the message-passing systems are numerous and mutually contradictory. In the present invention, the startup time of the transfer seen effectively by the user is designed to be as low as possible.

Third, the message passing system 60 of the present invention provides for a complete set of transfer channels 84 between all user processes 64. No arbitrary limitation is imposed on the ability of any process 64 residing on any processing element 22 to communicate with any other process 64 within the system 60.

Finally, the message passing model of the present invention implements true file I/O transparency. Any user process 64 executing on any node 74 should be able to execute all of the basic I/O operations, such as printf, fopen, fclose, etc. The implementation of this feature solves the existing problems with I/O functions which presently limit I/O operations only to those processes executing in nodes which have a direct channel link with a host adapter.

Low Startup Time

In order to understand why a low startup time is chosen as the basis for the design of the present invention, it is helpful to recall the model of the physical link transfer time as defined in Eq. (1). In the k*n+b formula, k is the transfer rate, n is the message length and is b the startup time of the channel. What the present invention recognizes is that this same formula applies, regardless of whether a hardware link is used to set up a channel or whether the channel is a virtual channel set up in the memory of the processing element of a node. It can be seen that any reasonable implementation of virtual channels implemented in software will have the transfer time calculated by the same formula as set forth in Eq. (1), with the same (or almost the same) value of k, but with a much greater value of b. Indeed, when passing very large messages, the overhead time introduced by the software tends to be small compared to the time of transfer itself. Unlike the case of physical links, the "b" value for the virtual, software-implemented channels depends on the particular way of software implementation. Making the "b" value as small as possible, especially for the transfers within the same node or between directly connected nodes, means that the need for the application programmer to directly use and manipulate physical links in order to optimize performance is eliminated.

The objective of making the startup time as small as possible greatly simplifies the message passing system of the present invention in general, both in use and in implementation. Interestingly, this objective is in sharp contrast to most of the complex message passing techniques which have been proposed by others in the CSP field, such as adaptive routing, conditional deadlock prevention, and dynamic load balancing. Each of these proposed message passing techniques potentially increase the value of "b" due to large time overhead introduced by the software. Indeed, while such complex message passing techniques tend to improve the behavior of the system in general, especially a system having a large number of processes and nodes, they tend to spoil the performance of individual transfers, particularly transfers within the same processing element or between directly connected processing elements. The increased value of "b" brought about by these complex techniques is especially unsatisfactory for parallel processing systems having smaller numbers of processes and nodes, where such problems as traffic jams, etc., usually do not appear. It has been found that the problems introduced by complex message passing techniques with respect individual transfers are more troublesome than might be expected because most real-life user programs involve only small numbers of processes and nodes.

A Hardware Viewpoint of the Present Invention

Figure 14:
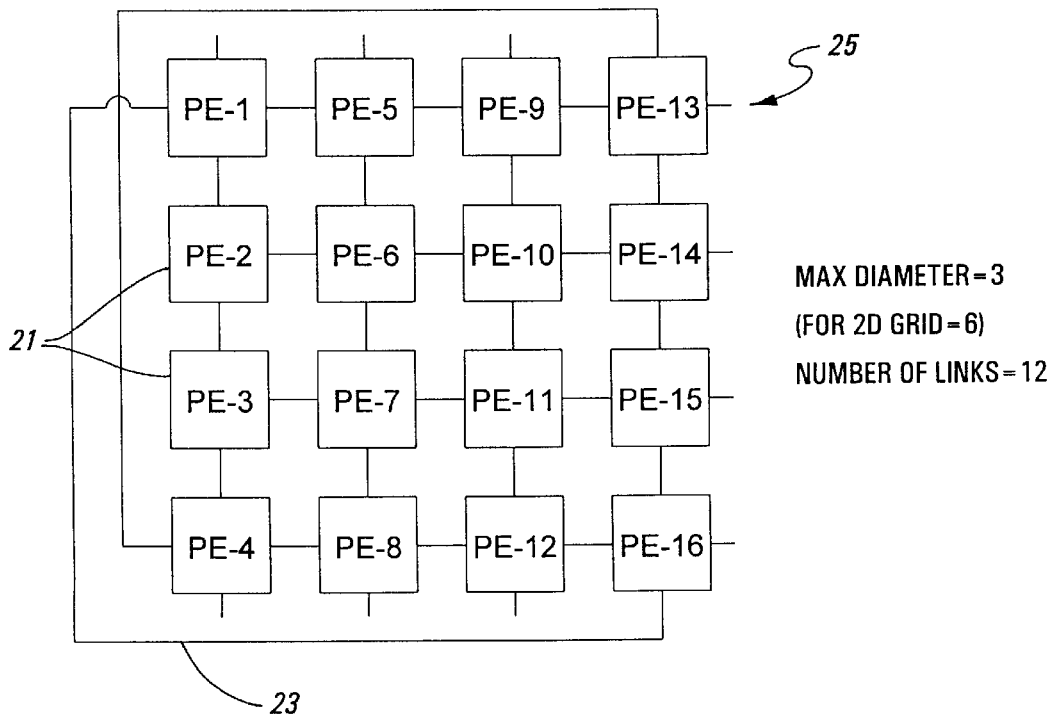
FIG. 14 is a simplified block diagram of an irregular grid connection network for a MIMD computer processing system in accordance with the message passing system of the present invention.
Figure 16:
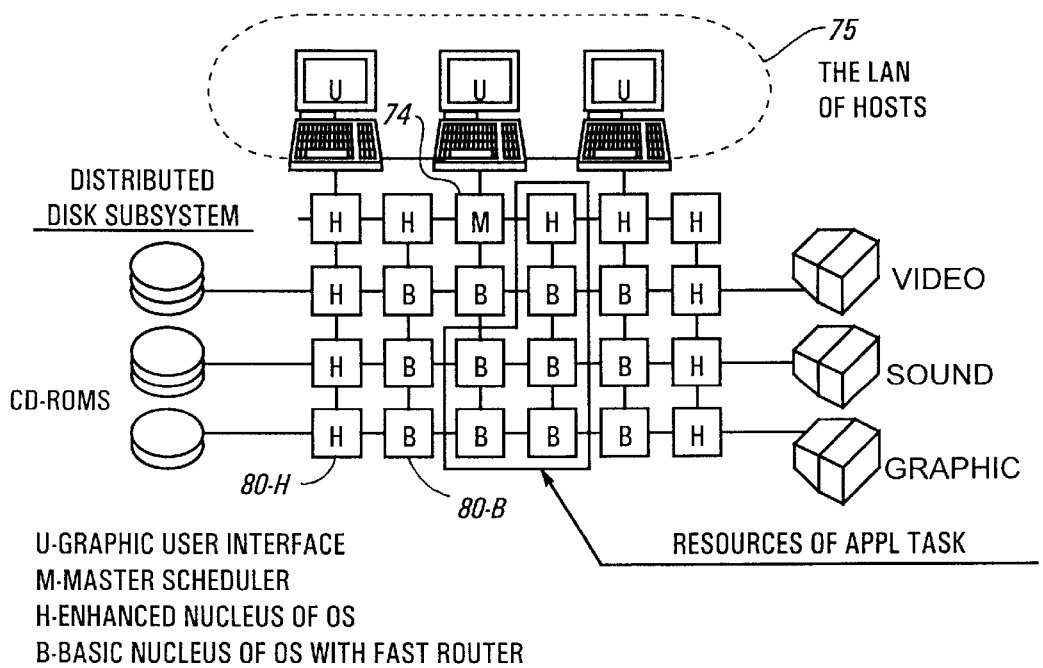
FIG. 16 is a block diagram of a preferred embodiment of a multimedia operating system utilizing the present invention.

Preferably, the present invention is implemented in an irregular 2-D connection network 25 as shown in FIG. 14 in which the processing element 21 are not all regularly connected to one another. As shown, for example, hardware connection 23 directly connects PE-1 to PE-16. Because of the irregular connections, the maximum diameter of network 25 is only 3, as compared with a maximum diameter of 6 for a classic regular 2-D connection network 24. Moreover, the open links of network 25 can be connected to peripheral devices as shown in FIG. 16.

Figure 15:
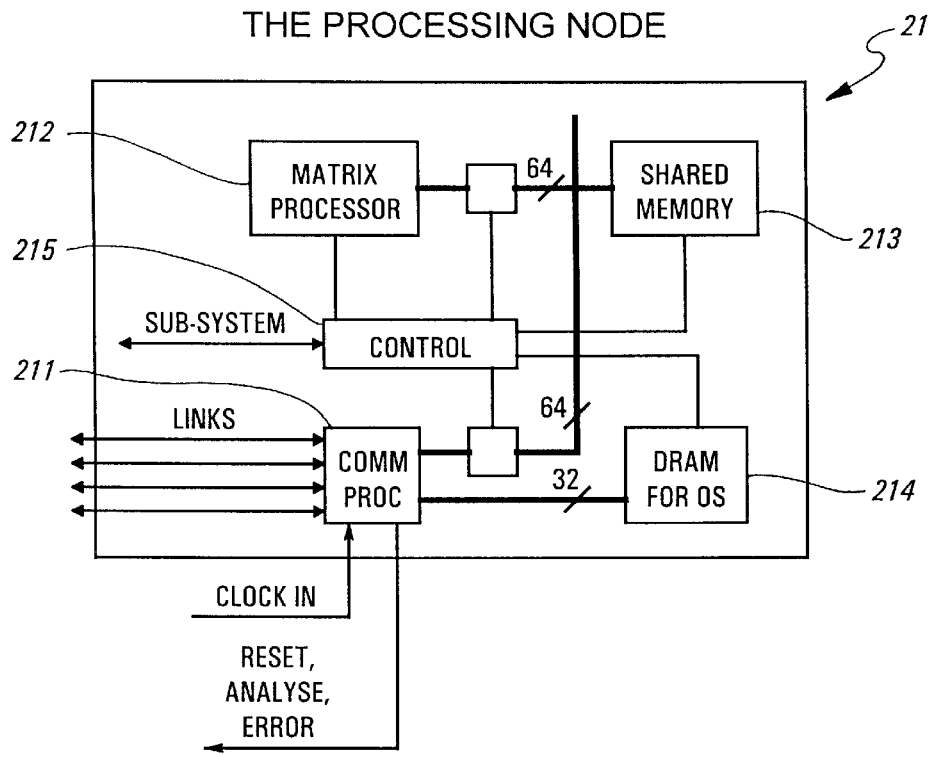
FIG. 15 is a circuit diagram of a preferred embodiment of a processing element of the present invention.

In a preferred embodiment, as shown in FIG. 15, each processing element 21 is comprised of a pair of processors, a communication processor 211 and a matrix processor 212, both of which share a shared memory 213. The routing and operating system code resides in a separate DRAM 214 and a set of control logic 215 controls and arbitrator access by the processors 211, 212 to and from the memories 213, 214 with the processing element. While such a dual processor configuration is preferred to enhance performance, it will be seen that any number of know hardware implementation for the processing elements of MIMD parallel processing computer system may be utilized with the present invention.

A Programmer's Viewpoint of the Present Invention

To aid in understanding the operation of the present invention, it is helpful to examine how the present invention appears to a programmer in terms of understanding the programming model in which a user's program code will be executed. Other than understanding the fundamentals of a CSP programming model and the C programming language, a programmer writing a user program to be executed using the present invention will need to be aware of the following:

1). The user code 62 is a set of user processes 64, created at compile time. If some processes are started dynamically, they can not directly use the message passing system 60 of the present invention.

2). The user processes 64 are numbered from zero, and are mapped onto the network nodes 74. Network nodes 74 may send messages 70 of arbitrary length to each other, identifying the receiver by its node number. Network nodes 74 may reside on different physical processing elements or the same physical processing element, depending upon how the user processes 64 are mapped to the physical processing elements in accordance with the configuration description 68.

3). The discipline of message interchange is traditional CSP programming model channel-like communications, with the only exception being that the send/receive operations do not wait for an end of transfer.

4). Any network node 74 may perform basic Posix-style I/O operations independently from any other network node 74, provided there is no resource clash at the node 74 which is actually providing the I/O service.

These four paradigms are implemented such that:

1). Any node 74 has N–1 (virtual) channel pairs 66 in the form of the set of transfer channels 84, N being the number of network nodes 74 in the message passing system 60. Input channel number i comes from node number i, output channel number j goes to node number j. No additional channels 66 may be created during execution of the user code 62, and the channels 66 mentioned above can not be created or destroyed they just exist by the definition.

2). Any channel 66 may either be free or have exactly one transfer in progress, the latter meaning the channel is busy. Thus, there are no queues, ports, etc. in the message passing system 60. When a channel 66 is busy, no more transfers may be started in that channel. Different channels 66 within the set of transfer channels 84 are independent, and may work simultaneously.

3). A channel transfer occurs when the reader starts reading and writer starts writing, i. e., by the mutual agreement, and, because those two conditions take place simultaneously, the transfer is sure to be over in some finite time. If only one side of the channel 66 starts the transfer, and the other does not, the transfer might never finish. The lengths of messages 70 should be supplied at the both sides of a channel 66 and should coincide for the same transfer and it is up to the application to insure that this happens. (It should be noted that when the length of a message 70 does not coincide at both sides of a channel 66, the message passing system may hang or crush).

4). Besides the "start read/write" primitives, a process 62 has four other control primitives which it can execute: query read/write over on specified channel and wait for the read/write over on specified channel. Waiting for a free channel returns immediately and is a legal action.

Summing it up, it can be seen that the discipline of the present invention really resembles a true CSP programming model, but the present invention is asynchronous with respect to the end of transfer and guarantees that any pair of user processes 64 is connected by one and only one channel pair 66. All the functions mentioned above are organized as the following C function interface which would be implemented in the user's C program code as set forth, for example, in Appendix A-1.

A System Viewpoint of the Present Invention

As previously described, any message passing system built upon the Inmos C Toolset is composed of a number of linked nodes 74, each of which is executing code for some user process 64, and a configuration description 68, which connects processes 64 by channels 66 and places them all on the hardware resources. From the system viewpoint of the "black box" nodes 74, the message passing system 60 of the present invention is organized according to the following conditions:

For each user process 64, there is one and only one router process 80, which should be placed on the same node 74 as the user process 64 it serves. The latter is important, because, for the purpose of efficiency, these two processes share some of the same data structures, addresses of which are transferred between them via virtual channels.

As shown in FIG. 7, a user process 64 and a corresponding router process 80 are preferably connected by two communication channel pairs 82. The first is the I/O channel pair 82-1, to which the user process sends the file I/O protocol requests. The I/O channel pair 82-1 allows the user process to "assume" that this channel pair is connected directly to the host computer, and thus the user process is able to perform printf and other basic I/O operations that normally would be reserved for processor nodes directly connected to the I/O node. In this way, the message passing system 60 of the present invention emulates the host I/O for the user process. The second channel pair is the MESSAGE channel pair 82-2, serving the explicit message passing from one user process 64 to another. Unlike the I/O channel pair 82-1, a user process 64 may not "assume" that the message channels 82-2 are connected directly to some other user processes 64. Instead, the message channels 82-2 are operated in accordance with the protocol which will be described. Together, these two communication channel pairs 82 carry some non-trivial protocol, issued and interpreted by the user-called library functions listed above.

Any number of user/router process pairs 64, 80 may be placed on a single processing element or any such pair may occupy a separate processor elements in a connection network.

Unlike the prior art message passing systems, the message passing system 60, by using a router process 80 having an array of transfer channels 84, allows processing node 74 to be connected in an arbitrary network topology, with only the following restrictions: All transfer channels 84 should be connected to transfer links 76 and should map to real hardware resources, either memory or connections. In this way, the transfer link connection is a subset of a physical topology of a connection network, and the job of the router processes 80 and array of channel links 84 is to emulate for user processes 64 a network topology in which any is connected to any. To do this, router processes 80 have to know the real underlying connection topology, and configuration description 68 provides such information.

As shown in FIG. 16, there is a special node 74 in the network, called the I/O SERVER-CONCENTRATOR 78, which resembles a router process 80 because it is connected by a transfer link 76 to some other router process 80 in the message passing system. Unlike other router processes 80, however, the I/O server concentrator 78 has only one transfer link 76 and thus is never intermediate in any transfer. Additionally, the I/O server concentrator 78 does not carry a user process 64 upon it. The processing node 74 for the I/O concentrator 78 is really connected to a host computer 75 and thus is the only process that can "really" perform printfs and other basic I/O functions. The job of the I/O server concentrator 78 is to serve as a background for the I/O emulation performed by the I/O channel pairs 82-1 and router processes 80 on all the other nodes 74.

In a preferred embodiment, some of the functions of I/O concentrator 78 may be distributed to the operating systems of router processes 80 located in peripheral nodes 74. These peripheral nodes 74 are considered to have an enhanced nucleus OS (80-H), whereas interior nodes 74 can be provided with a basic nucleus OS (80-B), thereby further improving the performance of such interior nodes 74 by eliminating that portion of the OS required for particular I/O operations.

Referring again to FIG. 4, after compilation and linking, each type of process (i.e, user processes 64, router processes

80 and I/O server concentrator 78) has an interface list format specific for that linked process. For the server process 78 and user processes 64, the format of the interface list 68 is trivial and easily seen from examples. For the router processes 80, the interface list 68 is large and complex.

The Router Process

Figure 6:
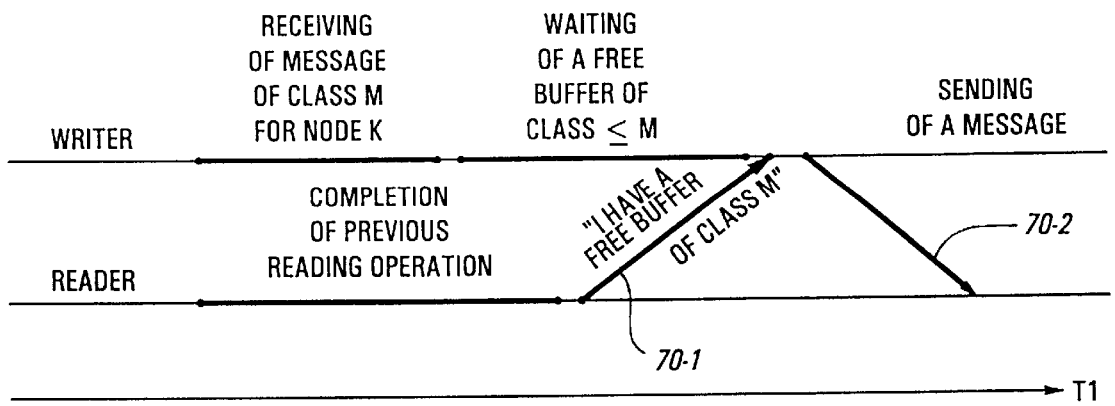
FIG. 6 is a simplified block diagram of the operation of reader and writer sub-processes within a preferred embodiment of the router process of the present invention.

The general transfer scheme of the router is designed in response to the very strong limitations imposed by the functional requirement to keep overhead as low as possible. As a result, the preferred embodiment of the transfer scheme of the router process 80 as shown in FIGS. 4 and 6, is kept as simple as possible. It implements a sort of oblivious store and forward routing. The routing tables 86 used to map a destination node number to a particular transfer channel number may be hand-coded in the configuration description for every node 74, except the server-concentrator 78. So, choosing the proper transfer channel from the known destination node number is achieved by just indexing in the routing table 86.

Two types of messages 70 circulate in the message passing system 60 of the present invention: those messages 70 explicitly sent by user processes 64 and other messages 70 generated by router processes 80 in order to emulate file I/O requests.

User Messages

In the CSP programming model, it is known that the consumption of any message 70 arriving at a destination node 74 should be guaranteed. The simplest way to achieve this is starting a message transfer only when the receiver reports its readiness to receive, i. e., the existence of a receive buffer. So, when some user process 64 starts a read operation, the user process 64 instructs its associated router process 80 to send a short control message 70-1 to the writer, which means "I am ready to receive a message from you". This message 70-1 is sure to be consumed by the recipient, because each router process 80 maintains a scale of ready flags for all other router processes 80. When a router process 80 receives an "I am ready" message from another router number N, it just sets the N-th flag in the scale.

After the user process 64 has instructed its associated router process 80 to send "I am ready", the user process 64 transfers to its router process 80 the address of a receive buffer 90 into which the user process want the read operation to occur. The router process 80 stores such addresses in a receive buffer array 88. The N-th element of this array 88 is the address of the receive buffer 90 to read from the node number N, if supplied.

Figure 5:
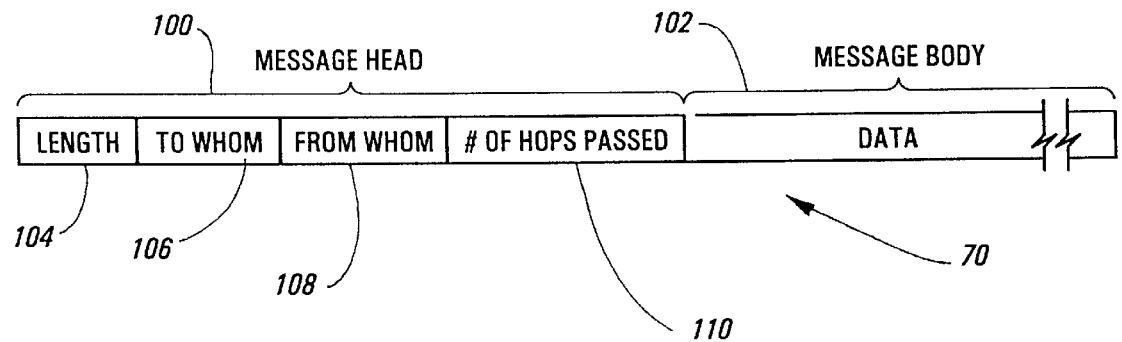
FIG. 5 is a simplified block diagram of the contents of a message package in accordance with a preferred embodiment of the present invention.

In the progress of moving from reader to writer, the "I am ready" message counts the number of hops it passes. In fact, it just has a field 110 as shown in FIG. 5, which is zero initially and is incremented by any intermediate node 74. When the control message 70-1 is consumed, the distance (in hops) from the reader is also stored, together with a ready flag 92.

What happens when a user process 64 wants to write? First of all, user process 64 blocks until ready flag 92 of the reader becomes set. Then user process 64 clears ready flag 92 and instructs its router process 80 to send a control message 70-2, passing to router process 80 by message channel 82 the length 104, number of whom to send 106 and an address 108 of a send buffer 94. The router process 80 examines the distance to the reader in terms of the number of hops 106 stored in the control message 70-2. If the distance is "1", i. e. the reader is physically adjacent, the router process 80 will send all the messages 70-1 as a single package 76 through the appropriate channel 66. Otherwise, the router process 80 slices the message 70 into packages 72, small enough to fit into standard along the network intermediate buffer 78 and numerous enough to pipeline the transfer. The information to calculate the proper package size is the distance to the reader, which is known from the control message 70-2.

When a package 76 arrives to a node 74, the router process 80 examines the destination node number. In the case the destination is reached, the package body is read from the transfer channel 84 directly to the read buffer 90, address of which has been stored when issuing "I am ready". Otherwise, it is stored in intermediate buffer 78 and then retranslated. Together with the read buffer address table, the router process 80 maintains a table of counters 88 to count the number of bytes received from any writer. When the count reaches the message length required, the read operation is over, and the writer's entries in the reader's tables of counters and read buffer addresses may be zeroed.

The preferred embodiment of the message passing system 60 is highly efficient and has the requisite low overhead for a number of reasons. It will be noted that redundant copying in both the reading and writing operation is eliminated in the message passing system 60 of the present invention, because only the addresses of the buffers 90, 94 are sent from the user process 64 to the router process 80, and not the message 70 itself. In the case of the transfer of a message 70 of any length between physically adjacent nodes 74, the present invention is clearly better than existing message passing systems. Other than some short communications between the user process 64 and the router process 80 inside the same processing node 74, and one additional short message between the writer and a reader, which is done to pass a message head, just one channel transfer is made, directly from the writer buffer to the reader one. No slicing takes place, no matter the length of the message 70. While the present invention is notably slower than the raw transfer media between adjacent processing elements 22, the adjacent transfer scheme implemented by the message passing system 60 of the present invention is very good in comparison with other message passing systems 40.

The arrays and tables mentioned recently are shown exactly in the form they are encountered in the C programming language of the preferred embodiment of the message passing system 60 in Table I. These arrays and tables are maintained collectively by a network node 74, both by the user process 64 and the router process 80.

TABLE I

```
========= /* user receive addresses for respective processors:*/
static unsigned char **useraddr;
========= /* required & done lengths for receive: */
static unsigned *l_reqd, *l_done; /* the same for send: */
static unsigned *l_reqd_w, *l_done_w;
========= /* user ready_to_receive flags, with # of stages values: */
static unsigned *ready_to;
```

In terms of the above, the user receive addresses is "the receive buffer array". Useraddr[i] is a pointer to the buffer to which a package body should be written, when a package comes from the i-th node. For instance, l_done[i] is a number of bytes read from the i-th node while receiving the current message. These counters make sense mostly because the messages are sliced, thus coming in portions. A scale of ready flags and an array of distances is, in fact, a single array. As a distance can not be zero, ready_to[i]==0 means that the i-th node is not ready to read from me, ready_to[i]==5 means that it is ready, and is 5 hops from the current node.

It should be noted that the data structures above are quite enough to construct the accurate foolproof synchronisation:

in fact, they count messages and prevent the user code 62 from running two simultaneous transfers in the same virtual channel 66. What they do not do, but can do partly with minor modifications, is recovering from the different message lengths specified on the different ends of the transfer. This is not done fully because it is impossible, due to the fact that a processing element 22 can not do physical dummy reads, and error recovering is thus unsafe: a situation may always occur in which there is no memory to recover.

I/O Messages

The second sort of messages 70 circulating in the message passing system 60 of the present invention are messages 70 that are created inside a router process 80 to emulate a user I/O function. To understand these I/O MESSAGES, it is first necessary to observe the Inmos I/O protocol generated by system runtime and passed by it by the host-connected links when the user process 64 requires file I/O. As previously mentioned, the I/O communication channel pair 82 connects the user process 64 and the router processes 80. The user process 64 "thinks" that those channels 82 connects it directly to the host 28, sends some protocol directed to the host by the outgoing channel and requires some responses from the incoming one.

The Inmos I/O protocol is fairly simple. Each host transaction consists of a REQUEST and a RESPONSE. Both are represented by messages, consisting of a head just a short integer with the body's length and a body of specified length. It is important that the transactions are strictly sequential. When a response is issued and a request has not yet arrived, no more requests may be issued: the user process just blocks inside the requested I/O function until the request is received. Bodies are never generated of a size greater than a maximum, constant and known in advance. This greatly simplifies the transfer synchronization, because the messages do not need to be sliced and are guaranteed to be consumed unconditionally. As a result, no "I am ready" messages are needed. It will be noted that slicing of I/O messages into packages still may be done for the purpose of efficiency, but in the preferred embodiment this is not done because the file I/O is usually either not a bottleneck in comparison with explicit message passing of user messages, or because the file I/O is sure to be a bottleneck due to host restrictions.

When a router process 80 receives an I/O request from the user process 64, the router process 80 just turns it into a package 70 with a standard network head and a body taken directly from the request, and sends it as a usual package to the server-concentrator 78. As it may be far, the standard network intermediate buffer size 88 should not be less than the Inmos I/O protocol body size. On the other hand, a server-concentrator 78 has to have a one-request buffer for every user process 64. For the unconditional consumption it is enough, because no other request may arrive from the same user until the current one is replied. It should be remembered also that explicit generation of server-directed messages is forbidden for the user processes 64, so those buffers in server-concentrator 78 are always free when necessary for use by the router process 80.

To send a message to the server-concentrator 78 "as a usual package", the server-concentrator 78 is assumed automatically to have the last+1 number as a network node 74, that is, the node number of the server concentrator 78 is equal to the total number of the user processes 64. This is reflected in the routing tables 86: the routes to the server-concentrator 78 are coded in them as well. The server-concentrator 78 itself does not need a routing table, because it has only one network entry.

When a server-concentrator 78 receives a package from some user process, it consumes it, reconverts it to Inmos format, replacing the network head by the Inmos one, and sends to host file server by the "real" host connection channel it possesses. When the response comes from the host file server, the procedure is repeated in backward order. When, at least, the reply arrives back to the router process 80 from which the request was issued, it reconverts it to Inmos format and sends to the I/O user channel 82. All this time the user process 64 has been waiting for the reply, so it consumes it immediately.

The Message Protocol

In the above discussion of the package flow in the message passing system 60 of the present invention, the "standard network head" of a package 70 was mentioned. Referring now to FIG. 5, the format of a standard package 70 of a preferred embodiment of the present invention will be described. A package 74 consists of a HEAD 100 and a BODY 102, which is optional. The head 100 has a fixed length, the body 102 may be of any length. A body length value 104 is stored in the head. A package 74 is always transferred in two physical channel transfers: first the head 100, then the body 102. It is because the hardware requirement of the preferred embodiment of processing element 22 that the length of the message read should be known in advance.

The head 100 is a number of words, each of which has a fixed meaning. Note that full words, and not halfwords, are used, in an effort to increase the processing speed of decoding the head 100. In addition to the body length value 104, the head 100 includes a to whom destination node number 106, a from whom destination node number 108 and a number of hops passed 110. The length 104 may be zero, meaning that the body 102 is absent. Such zero-length messages have special meaning they are the "I am ready" messages previously mentioned. The number of hops passed 110 is a stamp that increments at each hop during the transfer. The other fields are constant throughout the transfer.

The Router Process Structure

The router process 80 must react to asynchronous events, so it can not be coded as a single process. If it were a program component in a computer with the more or less traditional architecture, the router process 80 would be coded as a main process with a couple of event handling procedures invoked on interrupts initiated by the links 76. The links 76, however, do not interrupt the node 74, because there are no interrupts at all in the architecture of the CSP programming model. Instead, the CSP programming model provides for many asynchronous processes, communicating via the channels. Consequently, the preferred embodiment of "router process" 80 is not a single process at all, but is a number of communicating sub-processes, all sharing a common data structure. What has been referred to as "router process" 80 up to now is just an initializer of a group of sub-processes that are started dynamically, with the code implementing them compiled and linked together so as to simplify the program text.

The problem of decomposition of a router into sub-processes and establishing communications between them is non-trivial, because the potential danger of deadlock exists. To realize that the danger really exists, imagine trying to code a router as a single sequential process. Such implementation is sure to deadlock at the very first moment, because of the fixed order of inputs and outputs. But suppose that the fixed order did not appear to cause an immediate deadlock. Such a situation might be as follows:

1). each incoming router channel has a READ process, with an internal channel to which it outputs what it received, 2). each outgoing one has a WRITE process, with an internal channel from which it inputs what to send, 3). there is a MANAGER process, connected by internal channels to each reader and writer. It loops endlessly, querying the readers' internal channels.

As soon as any one is ready, it reads from the reader, writes to the proper writer and loops again.

While such a construction of a single router process seems quite asynchronous, it will deadlocks. Generally speaking, when only one manager is used for many potential reader-to-writer connections the deadlock situation will exist. While the connection between, say, reader 0 and writer 2 is served by manager, need for connection between reader 1 and writer 3 has arisen, but it can not be served until connection 0 2 is served, because the manager is single. This introduces DEPENDENCY between those two internal transfers. Many such dependencies in the message passing system may occasionally form a cycle, and, as a result, the system clinches.

It should be noted that the situation described here is still not a "real" deadlock, in that this situation may be eliminated by rearranging the behavior of the program not seen from outside. In other words, it is a deadlock due to the improperly coded program. The problem of "real" deadlocks that depend on the connection topology of the message passing system and require changes on the node level will be discussed at a later point.

Figure 8:
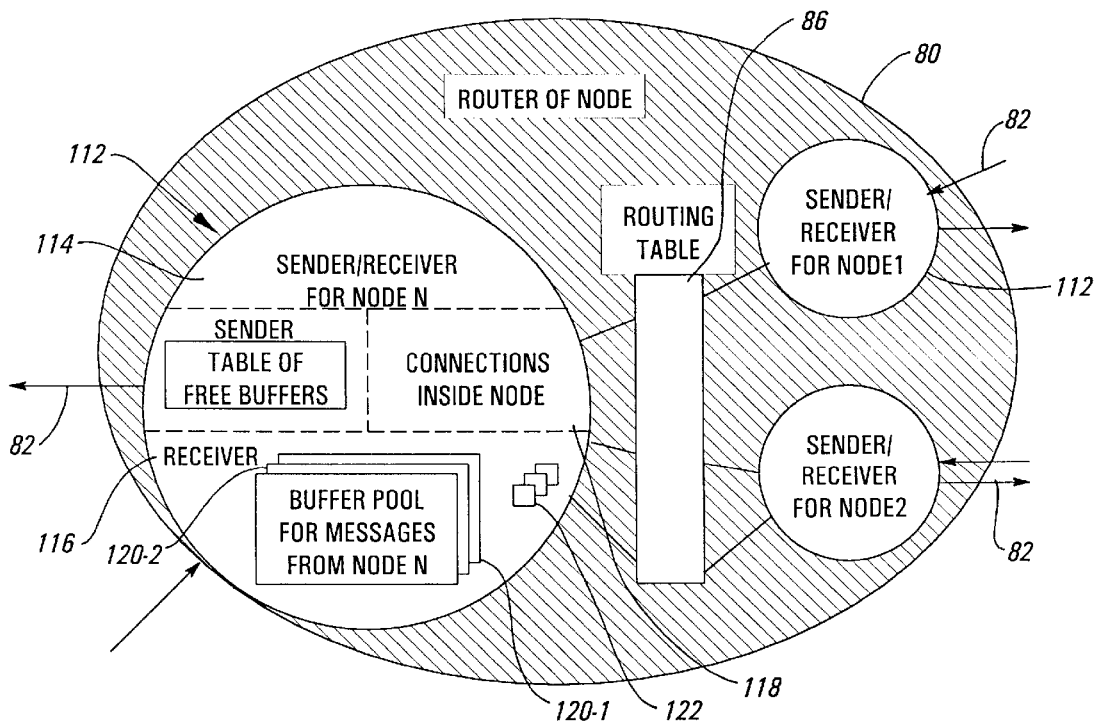
FIG. 8 is a block diagram of a preferred embodiment of a router process of the present invention.

The way to avoid the artificial deadlock situation constructed above is to eliminate the "manager" process as shown in FIG. 8. In this embodiment, there is a sender/receiver 112 for each node 74 with router process 86. Each sender/receiver 112 includes a writer sub-process 114 and a receiver sub-process 116. Each writer sub-process 114 is connected by internal channels 118 to all reader sub-processes 114, and does a manager work for itself: each writer sub-process 114 queries all the channels 118 coming to that writer 114 from readers 116, inputs from the first reader 116 encountered ready and outputs to the transfer link for which the writer is responsible. Preferably, each reader 116 has two or more buffers 120-1, 120-2 to which it may input. When something is input, reader 116 marks the buffer 120-1 "full" and outputs its address to the writer 114 by the internal channel 118. As soon as the address is taken by the writer 114, the reader 116 may try to input to the other buffer 120-2. Before trying, it has to be sure the buffer 120-2 is free of the previous portion. This is accomplished by having the reader 116 block until a "full" flag 122-1 of the buffer 120-1 which is being requested becomes deasserted. Deasserting this flag 122-1 is the job of a writer 110 that has got the buffer 120-1 marked "full" the last time.

The buffers 120 for the packages to be stored and retranslated are organized as a busy tag (1 word), a package head (of SIZHEAD words) and a package body or package address, depending upon whether the package is an I/O package from a communication channel 82 which needs to be translated into a standard package 100, whether the package is a user message from a communication channel 82, or whether the package is from some other node 74. It is preferred that the buffer 120 be coded as structures/unions, not as arrays. The busy tag may have one of the three values: (i) "0"—meaning the buffer 120 is free, (ii) MESSAGE_TO_LINK—meaning the package body is stored in the buffer 120, or (iii) USER_TO_LINK—meaning a package body address is stored in the buffer 120.

It will be noted that this discipline for the writers 114 and readers 116 includes minimum overhead. There are no queues, no searching, no signals or semaphores, no buffer pool management, and, surely, no redundant copying as addresses, not messages, are transferred by internal channels 118. A preferred example of the router source code organized according to this discipline is set forth in APPENDIX A-2. In this example, all printfs are commented out because the preferred embodiment of the router code is linked with a "reduced" system library which includes no I/O services. While the router process 80 offers the I/O services to the user process 64 it serves, the router process 80 cannot perform I/O services itself. The function "ProcAltList" is a standard CSP programming construction that means "query a list of input channels and return the number of any one ready to input" in some finite time. Unlike channel reads and writes, "ProcAltList" is not a single transputer instruction, but it is an accepted practice to include such a facility into low-level standard communication libraries as a single communication primitive. The function "ProcReschedule" is another traditional primitive, usually found in low-level standard libraries. It should be noted that a busy waiting does not prevent other processes from elapsing the CPU time. It just places the process that invokes it to the end of the process scheduler's list of processes ready to work.

To make the picture complete, examples of two more source files are described—"router.h" (as set forth in APPENDIX A-3) and "routelib.c" as set forth in APPENDIX A-4). It will be noted that routelib.c is not a part of router process 80, but the user process 64 which interfaces to router process 80. It mainly consists of the functions described above. It may seem surprising at a first glance that the standard library to be invoked from an application includes the function named "main". As the router services 80 need some startup performed by the user process 64, the main is transferred to the library. The user main function called from "main" after the startup is called "r_main" and receives all the arguments that the "main" does in the Inmos C Toolset.

To understand the import of parameters from the configuration, a sample configuration description 68 is also presented in APPENDIX A-5. The only thing that may be not clear from scratch when reading this example is the Inmos agreement about the host connection channels. It is assumed that the file I/O runtime imports the host connection channels as the first two interface parameters, so they should be supplied like this in a configuration description, if only a printf I/O function is desired.

The source code for the server-concentrator server 74 is not included because it is not interesting and is overloaded by the "technical peculiarities" like rudimentary graphics, primitive arbitration preventing the opening simultaneously too many files and so on, that are particular to the architecture of the processing element 20 and host computer 28. For completeness, the source code of the user process tnet.c is included in APPENDIX A-6. In this example, all the user processes 64 execute the same code. It is typical enough, but is not obligatory. The sample code tnet.c is just a network complex test and does the following: (i) start reads from all the other nodes, (ii) write to all nodes the array with a counter, shifted by the self node number, (iii) wait for all reads to be over, (iv) ensure that everybody sent to this node the counter, shifted by its node number. This process is then performed many times.

DEADLOCKS AND IRREGULAR NETWORKS

With the basic structure of the present invention now in mind, the next section discusses the development and application of the present invention and the problems of deadlocks and irregular networks.

Provided a message passing system has only about 10 nodes that may be hard or softwired to different topologies, it is possible to experiment with changing the physical topology. As soon as we try to start such an experiment with some untrivial message length and large number of times to execute (10000 and 10000, for example), using for the physical connection a ring of 5 nodes at least, the program would hang inevitably, perhaps, at different moments in different runs. In other words, it deadlocks, depending on some subtle timing circumstances. This is shown graphically in FIG. 10 for a 4×4 network of nodes. When there is a loop of requests, all nodes 74 in the loop will end up waiting on each other as they are not able to recognize the deadlock situation.

In the present invention, an optimal set of loop-free subgraphs are created, as shown in FIG. 11, and, as a result, there is deadlock-free routing map for fast communication among nodes 74. A ring is an example of a CYCLIC topology, while the simplest pipeline topology we started with is an ACYCLIC one. Unlike the simplest topology, the router of the present invention does not require an acyclic topology to work well. The program also works on a rectangular grid, a topology containing just a series of cycles. To understand this better, this discussion all needs some more theoretical background.

Buffer pool structuring by channels

The intuitive opinion that the problem has something to do with the presence of cycles in the topology is quite true. To start from the beginning, let us make a router that is able to work only on the acyclic topologies. That is, a router that deadlocks on a rectangular grid as well as on the ring. What should be changed is the order of intermediate buffers' assigning to packages. To do this, we decided that each reader process inside a router shall have its own subset of intermediate buffers. Although we originally did this just for the purpose of saving time of execution, because any other technique requires some non-trivial buffer pool handling overhead, it also turned out to be also an anti-deadlock feature mentioned above. We then changed this assumption and organized a common buffer pool for the whole router. When a reader process needs a buffer, it tries to obtain a buffer from the common buffer pool. If a buffer is not available, the reader process blocks until a buffer becomes available.

Figure 12:
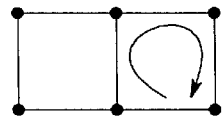
FIG. 12 is a graph diagram of the prior art message passing network of FIG. 10.

Such a router will block on a rectangular grid as well because a dense stream of packages coming from any single link may capture temporarily all buffers. If such situation occurs cyclically and the necessity for one more buffer to deblock forms a ring, the network would clinch. Graphically this is shown in FIG. 12. With the version observed above this could not happen, because no package coming from link #0 could ever obtain a buffer allocated for a reader #3. The restrictions like this are generally known as BUFFER POOL STRUCTURING techniques. This particular way of the buffer pool structuring is named STRUCTURING BY CHANNELS, because buffers are allocated for the particular channels, and only a message from a channel to which a buffer is allocated may occupy a buffer.

It is clear that a router based on a channel-structured buffer pool works on a topology with no cycles (for example, any sort of a tree), and we see that it may work on some cyclic topologies (grid) or not work on other cyclic topologies (ring). But why would a 2 by 2 grid not be a ring? To formulate this question precisely, what is the class of the topologies which the router of the present invention can accommodate? The graph theory specialists refer to this class as to the "topologies with the acyclic channel dependency graph". To understand this in practice, let us do the following:

First, think of the physical topology as of a directed graph of NODES and CHANNELS, but not links. Each bidirectional link is not one, but two edges of a graph, having opposite directions.

Second, decompose a graph into a number of SUBGRAPHS so that any edge belongs to one and only one subgraph, but any node may belong to any number of them.

Finally, examine the order of passing by the subgraphs when travelling by any route. For example, when moving from node A to node B by the route coded in routing tables, we first travel through the subgraph number 1, then through the subgraph number 3, etc.

The basis for this process can be set forth as a Theorem 1:

IF such a decomposition of a topology exists such that:
each subgraph is acyclic,
each route passes any pair of subgraphs in the same order as any other route passes this pair,
THEN the channel-structured buffer pool routing is deadlock-free.

Instead of rigorous proof of this theorem, it is easier to note that there may be no cyclic dependencies inside a subgraph. Moreover, there may be no dependencies between subgraphs because these "parallel universes" are passed by any package in the same order. If one has to enter subgraph A, no other one may, explicitly or implicitly, want to enter "his" subgraph from A. And finally, as the buffers are tailored to channels, the "parallel universes" are really parallel, i. e. independent.

Figure 13:
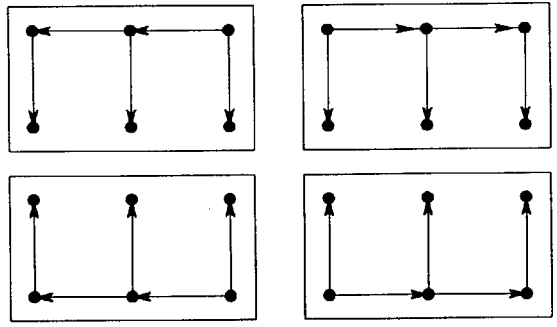
FIG. 13 is a graph diagram of the message passing network of the present invention as shown in FIG. 11.

Such decomposition of a rectangular grid is straightforward. Indeed, as shown, for example, in FIG. 13. Any route in such a grid lies completely in only one subgraph of the following 4 ones: the "up & right" one, or "up & left". Or "down & right", or "down & left". Each such a subgraph is acyclic.

Finally, let us stress two assumptions we made implicitly just above.

1). We considered the oblivious routing solution. With the adaptive routing, the theory of avoiding deadlocks is quite complex.

2). When speaking about the ring and a grid, it is assumed that the routing tables contain the MINIMAL routes. It is possible to organize such a routing on a ring that it becomes deadlock-free (for example, by just ignoring one of the links), but this routing table will not be minimal in terms of hops necessary to travel from a node to another. Similarly, it is possible to organize the deadlockable routing in a grid, but it is sure to be not minimal, as a minimal one's deadlock freedom was shown above.

The most remarkable thing concerning this theory is that it works "by itself". It is not necessary to introduce the subgraphs and decompositions anywhere into the sources of the programs. Just apply the channel-structured buffer pool, and for some class of topologies it will work. But for some others . . . . How much do we lose restricting the topologies used to the "good" ones?

Consider an envelope 4 by 4 processors (i. e. a 4 by 4 rectangular grid with diagonal connections added. The NETWORK DIAMETER (the longestin hops minimal route in it) for this topology is 3. To make this topology "good" in the sense covered above, it is necessary to restrict the use of diagonals to the nodes adjacent to them. That gives a diameter of 5 only 1 less than a diameter of a grid with no diagonals at all. So, there surely is what to struggle for.

To make the router of the present invention work on the wider class of topologies (in fact, on any topology that is fully connected) it is best to choose some other scheme of the buffer pool structuring other than by channels.

One alternative is to implement a very complex algorithm with the elements of global knowledge of a situation in a network, capable of detecting deadlocks and deblocking each particular occurrence of a deadlock by special "emergency" procedures. This is quite a special area of knowledge and is not very effective from the viewpoint of requiring a low startup time, especially for the networks that are not extremely large. With very large networks such algorithms may be useful because some of them may be applied to adaptive (non-oblivious) routing thus solving the problem of deadlocks together with the problem of load balancing of traffic.

It should be noted that not just any scheme of dividing messages into packages may be used with any scheme of the buffer pool structuring. For example, the wormhole routing may be used only with the channel-oriented buffer pool structuring, and thus can practically not be adapted to "bad" topologies. It is because the packages of different messages can not be interleaved in wormhole schemes: to structure buffer pool not by channels we should in fact have to buffer not packages, but whole messages, which is impossible because their lengths are not limited.

CHANNEL MULTIPLEXING techniques, for example, may be used, when special software is introduced to emulate several independent links on a single physical one. By "adding" links in this way, it is usually possible to make a topology "good" in the sense covered above. Surely, such a software multiplexer of a link should be designed and coded very carefully to provide the truly independent functioning of the virtual channels it implements. It is sure to require passing some additional control messages by the physical link, and thus introduces non-trivial execution time overhead. The question is if the gain obtained using the topology with a little diameter worth the loss of time in the multiplexer.

Buffer pool structuring by hops

The last thing to examine is to see how the store and forward method's ability to interleave messages may help to find the buffer pool structuring technique able to cope with an arbitrary topology. We still restrict our considerations to an oblivious routing. Such a method exists and is named STRUCTURING BY HOPS. Let us construct the scheme in two steps. In the first step we construct it in theory and then see than it is unimplementable. In the second step we improve it.

Step 1.

Let a buffer pool be single for all the readers of a node. Let the buffers be subdivided into CLASSES, with one buffer in each class at least. There must be as many classes as the longest route in the network plus 1.

Let any package be stamped by a number of hops it has passed. When a package is issued, it has a stamp 0, at the next node it has a stamp 1, etc. Let this stamp be the CLASS OF A PACKAGE.

Let the package of class N be able to occupy only the buffers of classes 0 to N inclusively, but not the higher ones.

Theorem 2.

This sort of routing is deadlock-free.

Proof.

Each message can wait only for a buffer occupied by another one, which is closer to the destination than itself is. As the routes are finite, the cyclic waiting is impossible.

Proof over.

Note that counting the hops already passed is not the only choice possible. The scheme may be built that counts the number of remaining hops as well, and it essentially makes no difference.

This is, perhaps, conventionally acceptable, but there is a great catch in the scheme proposed. How does the node's router know what buffers may be transferred and what ones have to wait? In the router covered above, the messages arriving to intermediate nodes were output in arbitrary order. No information was extracted from the adjacent node if it is possible already to output. With the channel-based buffer pool structuring, it all worked for the "good" topologies. If we do the same with the hops structuring, we may try to output first the message that has the lower class. If there is no buffer for it, it blocks the channel. The message with the higher class that we wanted to output second is thus blocked, though the buffer for it exists at the adjacent node. Deadlock.

One way to avoid the problem is to output first the messages with the highest classes. But, what does "first" mean? When a decision is made as to what to output first, how can we be sure a great deal of the messages of a very high class are not just now arriving from another link? Apparently, this scheme requires a CENTRAL MANAGER to maintain the buffer pools globally. For such fast and reactive networks as the transputer ones this solution is inacceptable. Too many control message need to be exchanged to emulate such a manager in the distributed-media network.

The local managers are designed (invented) by managing just the adjacent nodes in the following manner. Let any link writer of a node examine the buffer pool's scale of free buffers. As soon as it changes to the best (some buffer frees), it writes to the neighbor the special control message about it. This lets the adjacent node send only packages that are sure to be accepted. If there are no such ones, it really waits, but the channel remains unblocked. If a package arrives of the higher class that may be sent, it is sent.

Figure 9:
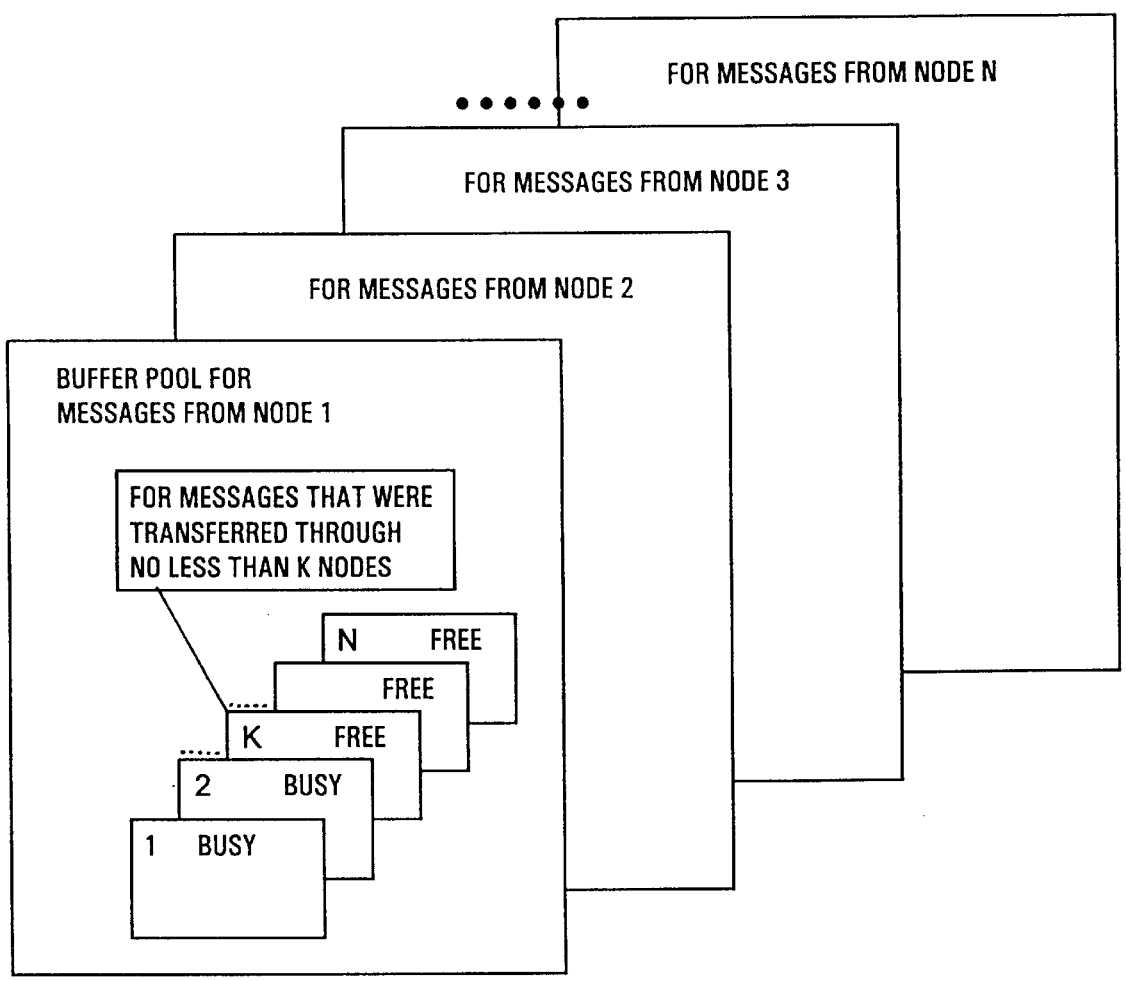
FIG. 9 is a block diagram of a preferred embodiment of a buffer pool structure in accordance with the present invention.

The last catch in this scheme which has to be dealth with, is to make sure that a buffer thought to be free is not captured by a package coming to a neighbor from another processor adjacent. The solution to this catch is really quite easy. Let us first structure the buffer pool by the channels, and then structure any reader's subpool by the hops. The local free buffer scale reporting becomes safe nobody but myself can occupy my buffers, I need only the freeing of them to be reported. An example of this is shown graphically in FIG. 9.

The data structures for the preferred router

A version of the router 80 is presented below that implements this procedure of buffer pool structuring. To help reading the sources, let us examine here the main data structures that appeared in comparison with the previous version.

1). The additional buffers.

In the implementation presented, there are more buffers than absolutely necessary, for the purpose of gaining the speed of execution. First of all, the messages "I am ready to input" covered above should circulate as fast as possible, but are very short. To simplify and speedup their transfer, each node contains a separate "I am ready" message buffer for any pair of nodes in the network. From what was said above about those messages, for each pair of nodes there surely may be not more than one such a message from the first to the second in the whole network, at any moment of time. So, such messages are never delayed when the proper channels are free, and the buffer pool search is eliminated.

The messages generated by the file i/o system are also restricted in number. There may be not more than one "to server" and one "from server" package for any node in the network at any moment of time. This decision may be otherwise, but the preferred embodiment of the invention has special buffers for them as well. Each node has a buffer for any node's "to server" and "from server" packages.

The rest of the packages are the ones that are parts of messages generated explicitly. For them, the buffers are allocated due to the scheme presented right above.

2). How the processes interact inside a router.

The router decomposition into processes is generally the same as in the previous version. But the manner of interprocess interaction has changed. As the structuring by hops requires packages reordering in the writer's queues, it is no longer possible just to pass the addresses of buffers between the reader and the writer by channels.

The main implementation trick was not to change the buffer's "full", or "busy" tag covered above. This reduces the queues management overhead twice at least. Indeed, buffers are not transferred between different lists of "busy", "free", etc. They are listed once and forever in their "native" lists, for example, "a list of to-server buffers", etc. When busy, they are linked additionally to the proper writer's queue, and that is all. When the writer frees the buffer, it just deasserts its busy flag, and the buffer finds itself automatically in the "native" list of free buffers. There is no action of inserting a freed buffer back into the "free" list.

The structure of the writer's queue of busy buffers is also very simple. It is just an array of pointers to buffers, long enough to contain all buffers of the node so overflow is never tested and can not be a source of deadlock situation. The queue is maintained always dense when something is freed from the middle, the rest of the array is moved physically. This seems to be not as horrible as seems at first, because the transputer has a "block move" CPU command. But maintaining an array of pointers instead of a linked list with the necessity to look for the empty slot really saves time. Besides, such a simple discipline guarantees that the packages of the same message never change the order of sending, and this saves an "offset" field of the package head, which would otherwise be necessary.

The queues are maintained both by the writers that own them and the readers adding buffers to them, so each a queue has to be protected by a semaphore.

In fact, the writer's queue consists of not 1, but 3 arrays. Besides the buffer address table, there are the buffer link number table (it stores the number of the link to the reader of which the buffer belongs) and the buffer number table (it stores the buffer's serial number in the buffer pool of the appropriate link). This is done to enable the reporting of the fact of freeing the buffer from the writer that sent the buffer and made it free to the writer of the link to which's pool the buffer belongs. The latter may then report freeing the buffer to the adjacent node, as described above.

It should be noted that, from the viewpoint of both style and execution speed, these tables may be coded as something other than 3 separate arrays, not as an array of 3-field structures because this leads to the necessity of doing 3 block moves instead of 1.

3). Miscellaneous decisions.

Some small technical decisions have to be mentioned here.

Preferably, the writer process scans its queue circularly, and before each scan it tests if it is necessary to report the adjacent node about freeing of some buffers. This test is not trivial, because the buffers to be reported are freed by other writers, not the one that reports. Anyhow, the report of the buffer freed has to be done as soon as possible, to avoid deadlocks. So, reporting of the buffer becoming free may be delayed for not longer than the time of one buffer output.

Also, the additional table appears, preferably as a table of DISTANCES. It is important, because sending a message to the adjacent node needs no intermediate buffers and may be done on spot, without waiting for anything, as soon as the target buffer is ready. This table is constructed at the self-configuration phase (at startup time), and this is described below.

Finally, the format of the message head has changed to make it shorter as compared to the message 20 shown in FIG. 5. As the table of distances is constructed at startup, no "number of the hops passed" field is necessary. There are only three fields:

length of the body
to whom
from whom but they are overloaded in some cases.
There are two such cases:

First, when a "node to node" (not "node to server" or "I am ready") package is transferred between the not-adjacent nodes, only the low 2 bytes of the length carry the length. The high 2 bytes carry the number of buffer in the link buffer subpool of the adjacent node to which the message should be placed. Note that, as covered above, the decision of what buffer to place a message to is taken by the sender, and that is why the receiver has to report regularly what buffers are free.

Second, the second overloaded field is a "to whom" field. In this version, there are two types of messages such that "to whom" field's value is not necessary for them. They are, firstly, the messages with the information about what buffers are free at the adjacent nodes, and, secondly, the messages of self-configuration at startup time, which are covered below. These messages should be filtered out by any reader process as soon as possible to not increase the overhead at runtime. To do this, a special value FREEBUFS is used for "to whom" to mark the messages with information about free buffers. A byte scale of free buffers follows such a head.

Another special "to whom" value, ROUTCONF, marks the startup self-configuration messages covered below. The "to whom" field of such messages is ROUTCONF+n, where n is a hops passed stamp. Both ROUTCONF and FREEBUFS is greater than the maximal node number, which makes it possible to filter such messages out in a single "if" in a reader.

Automatic route tables construction

The other improvement of the router presented above is its ability to construct the routing tables automatically. The first thing to invent is something like the very well known "worm" or "spy" programs that try to spread themselves to all the links of the network. This idea, however, is not so good. On the one hand, some links may be connected to the special hardware like electronic routing switches, etc. On the other hand, it is not good to restrict the networks to those connected by links to be placed on some network nodes to the same processor. So, the compromise decision is to have the physical topology to be used by the network remain in the configuration description, but remove the routing tables from the configuration description. The "worm" or "spy" procedure is performed only on the channels imported from the configuration description. The idea of the procedure is following.

Assume that the channel topology is "quasy-link": no matter what channels are used, either the software ones inside a processor or the link-based ones, all the connections are bidirectional. For any connection from A to B one and only one connection from B to A exists. These channel pairs are referred to as "links".

At a startup moment, each node issues a special message "I am here" by all its links. The message is stamped by the hops passed. When this message arrives to a node, it is examined if it carries some new information about the node it originates from. If not (for example, a message from myself came, or a message came in 5 hops from a node from which another one came in 2 ones), nothing is done. Otherwise, a hops stamp is incremented, and a message is retranslated to all the appropriate links. Besides, in this case the routing table entry to the origin of the message is assigned a number of the link the message came from.

To understand if the message really carries any new information, each node maintains the two data structures the RELIEF TABLE and the ROUTE TABLE. Each one is a matrix. Here they are explained using the identifiers of the source code presented in Appendix A-7.

m_relief[i][j] is a relief table entry. Its value is the distance (in hops) to the i-th node from the current one, provided we travel through the j-th link.

m_routes[i][j] is a route table entry. Mind that it is not the routing table in the sense covered above, but an auxiliary data structure used at the self-configuration stage only.

The value is 1 if travelling through the j-th link to the i-th node is the shortest way to it, 0 otherwise.

There is also an auxilivector as long as the number of tosend. It is a vector as long as the number of links in the node.

The procedure consists of the following steps:

1). Emit the message "I am here" by all the links. Stamp it by number of hops passed equal to 0, and by self number of the sender.

Mark all reliefs as "very far", all route table entries as "not the shortest way".

On receive of the message "I am here" marked by the sender number S and hops number D, coming from link L, do:

2). If S equals to the self number, do nothing. (the mirrored message from myself has returned).

3). m_relief[S][L]=D+1;

4). Find the lowest relief value among the m_relief[S][i] for all i-s (for all links of the node).

5). if m_relief[S][L] is the lowest,

6). then count the lowest reliefs m_relief[S][i] for all i-s, mark the appropriate m_routes[S][i] with 1-s for the lowest reliefs and 0-s for not the lowest. Assign tosend [i] the same values as m_routes[S][i].

7). if the number of the lowest reliefs encountered at the previous step was 1, remember the retranslation is necessary.

Update the "real" router's route and distance tables for the node S, that are to be used during the regular work.

8). end if in p. 5

9). if it is remembered that the retranslation is necessary, increment the hops stamp and retranslate the message to all links for which tosend[i] value is zero.

The procedure description is over.

Preferably, to make implementation safe the access to common for the whole node data structures should be semaphore protected.

At the cost of some mental strain it may be seen that the procedure just presented should work, and it really works. But, there are several questions to the implementation, both concerning deadlocks.

1). First, is the procedure of self-configuration just presented above deadlock-free in itself? It may be stated definitely that for the case of unstructured buffer pool for the routing messages it is NOT. That is why a special buffer pool for the configuration messages at each node was introduced. This over____is not too bad, because the buffers are very small. This pool is structured first by incoming channels. For each incoming channel's subpool, a special buffer is provided for each pair (S,I) such that a message originating from node S has to be retranslated to link number I. Perhaps, it may be made less numerous, but it works like this, and the buffers are so small that there is not much need for careful optimization here. In addition, according to the procedure, no useless information is output twice about the same original node down the same link, so the procedure must be fairly efficient.

2). Second, it is obvious that if we start working when the procedure is not over, the deadlock situations may occur, because in fact working with the changing final routing tables is a sort of adaptive routing. So, for the purpose of safety, we have to know when does the procedure end? The answer is NEVER, and that is why it is called a "procedure", not an "algorithm". To be more exact, the procedure finishes at some moment, but there is no straightforward way for a particular node to discover the moment when the procedure is over, or, at least, a way for a node to know when the changes to the final route map are complete. This way should exist, but as of yet it has not been identified for. So, now a potentially unsafe way of finding the moment to start is used. This can be seen from the source code for the process flags_out:

the process first detects a moment when the final routing tables become constructed.

then it waits for a moment when they do not change during one second.

then it assumes they will change no more, and opens the locks of the user and i/o input for the node, starting the work.

Note that if the end of the procedure were found, it could be very useful for the networks with potentially unreliable links, to detect the hardware fails and reconfigure at runtime. This requires running the configuration procedure, say, once a minute, or once each 10 seconds . . .

3). The procedure as it is described here is sure to construct the minimal routes finally. But it ignores absolutely the load balancing of the links. It may overburden some links and underburden the others among those providing equivalently minimal routes from a given node. A simple way of partially balancing the burden is also suggested in Appendix A-7.

Nodes A and B can use C or D for connection with node E. From the point of efficiency A and B should use different nodes A use C and B use D or A D and B C. But procedure of self-configuration can't prevent situation then A and B use the same node for connection (for example C), because while A may choose between C and D for connection with E it doesn't know which node are used by B and vice versa. So this problem can't be resolved locally.

The final preferred version of the configuration procedure

As discussed hereinabove, one of the most important criterion by which the design was optimized is the pure startup time of transfer between the adjacent nodes. It is important because of the two considerations:

First, because of the case of existing physical connection, the virtual links should be as close to the physical in their performance as possible, in order to eliminate the necessity for using the physical links at all.

Second, because this is the minimum of overhead, the overhead in a real network may depend on the traffic, the buffer size, etc., but never can be better than the overhead introduced by the fact of transfer itself.

This minimum of overhead (the "b" in the "k*x+b" formula mentioned above) can be reasonably measured in "n–s". That is, we say that "the startup of a message is effectively the time of transfer of the n bytes". Well, for the both of the versions (which is remarkable, as the second one is much more complex) b equals 400 bytes. In this regard, the preferred embodiment resembles much the Inmos virtual links and is several times better than the handle level of communication of the early versions of Helios.

The last thing to do for the conclusion is to present the readme and packing.1st of the sources coming together with this text. There is a directory ROUTER which contains the final version described here. To build everything, enter the SOURCES subdirectory and execute the following .bat files:

compr compile the router, comps compile the server-concentrator, linkr, links link them.

Then copy the result of the work:

router.lku, server.lku and routelib.tco to the upper level (i. e. to the ROUTER directory.

Then enter the ROUTER directory and build the test:

mtnet.bat

Provided you have a standard Inmos pipeline of 4 nodes, with the transputers of type T8 or T425, you may then run the test:

iserver /sb mdos.btl 5000 10000

To do this, it is necessary to have the 2-nd generation version of the Inmos C Toolset installed. With the 3-rd generation version, some minor changes may be required, for example, replacing_memcpy by memcpy.

APPENDIX A-1

```
/* start read: */
        extern int r_read( int /*proc*/, void* /*buffer*/, int /*length*/ ); /* test read over: */
        extern int t_read( int /*proc*/ ); /* wait for the read over: */
        extern int w_read( int /*proc*/ ); /* start write: */
        extern int r_write( int /*proc*/, void* /*buffer*/, int /*length*/ ); /* test write over: */
        extern int t_write( int /*proc*/ ); /* wait for the read over: */
        extern int w_write( int /*proc*/ ); /* externals containing the self number & total number of nodes */ /* for the user process:              */
        extern int my_number, server_number;
```

APPENDIX A-2

```c
#include <stdlib.h> #include <misc.h> #include <process.h> #include <string.h>
#include <math.h> /* a simple non-buffering message router: */ #include
"router.h" /***/ /* tag values for the message head while routing inside: */ #define
MESSAGE_TO_LINK 1 #define USER_TO_LINK 2 /* data imported from the
configuration: */ /* routing table: */
    static unsigned *routes; /* the processor number: */
    static my_number; /* the server processor number: */
    static server_number; /* in/out channels, number of them, special channel
indices: */
    static int Size, ind_route, ind_prot;
    static Channel **Input = NULL, **Output = NULL;
    static Channel *HostInput = NULL, *HostOutput = NULL; /***/ /* soft
channels: */
    static Channel Ready[10]; /*/ /* router to user address output process: */
    void flags_out( Process *p ) {
    p = p; /***/
    ChanOutInt( Output[ind_route], (int)useraddr );
    ChanOutInt( Output[ind_route], (int)l_reqd );
    ChanOutInt( Output[ind_route], (int)l_done );
    ChanOutInt( Output[ind_route], (int)l_reqd_w );
    ChanOutInt( Output[ind_route], (int)l_done_w );
    ChanOutInt( Output[ind_route], (int)ready_to );
    ChanOutInt( Output[ind_route], (int)my_number );
    ChanOutInt( Output[ind_route], (int)server_number );
    ProcStop(); } /* link input process: */
    void p_input( Process *p, Channel *In, int n_of_me ) { /* In is Input, Out is
Ready: */
    unsigned *buf[2];
    unsigned *curbuf;
    unsigned buf0[SIZHEAD+1+(SIZPACK/sizeof(unsigned))];
    unsigned buf1[SIZHEAD+1+(SIZPACK/sizeof(unsigned))];
    int k = 0, leng, from, to;
    p = p; /***/
    buf[0] = buf0;
    buf[1] = buf1;
    (buf[0])[0] = (buf[1])[0] = 0; /***/
    while( 1 )
    {
    curbuf = buf[k];
    while ( curbuf[0] ) ProcReschedule();
    curbuf++;
    ChanIn( In, curbuf, SIZHEAD*sizeof( *curbuf ) );
```

56

```
leng = curbuf[M_LENGTH];
from = curbuf[M_FROM];
to = curbuf[M_TO];
curbuf[M_STAGES]++; /* examine the special cases: */
if ( to == my_number )
{ /* it is to me, receive & process: */
  if ( leng )
  { /* it is a message to me, so */ /* see if it is a message or a server reply: */
    if ( from != server_number )
    { /* message: */ /* receive directly, do not use writer: */
      ChanIn( In, useraddr[from], leng );
      useraddr[from] += leng;
      l_done[from] += leng;
    }
    else
    { /* server reply: */
      ChanIn( In, curbuf+SIZHEAD, leng );
      ChanOut( Output[ind_prot], &leng, 2 );
      ChanOut( Output[ind_prot], curbuf+SIZHEAD, leng );
    }
  }
  else
  { /* it is a ready-to receive message: */
    ready_to[from] = curbuf[M_STAGES];
  }
}
else
{ /* the message is not to me, route it: */
  if ( leng ) ChanIn( In, curbuf+SIZHEAD, leng );
  curbuf--;
  curbuf[0] = MESSAGE_TO_LINK;
  ChanOutInt( (Ready[routes[to]])[n_of_me], (int)curbuf );
  k = 1-k;
}
}} /* user input process: */
    void p_input_u( Process *p, Channel *In, int n_of_me ) { /* In is Input, Out
is Ready: */
    unsigned buf[SIZHEAD+2];
    unsigned *curbuf;
    int leng, nproc;
    p = p; /***/
    buf[0] = 0;
    while( 1 )
    {
```

```
        curbuf = buf;
        while ( curbuf[0] ) ProcReschedule();
        curbuf[0] = USER_TO_LINK; curbuf++;
        ChanIn( In, curbuf, SIZHEAD*sizeof( *curbuf ) );
        leng = curbuf[M_LENGTH];
        if ( leng == 0 )
        { /* user is going to receive: */
        curbuf[M_STAGES] = 0;
        }
        else
        { /* user is sending, the address is packed instead of stages, repack: */
        nproc = curbuf[M_TO];
        curbuf[SIZHEAD] = curbuf[M_STAGES];
        curbuf[M_STAGES] = ready_to[nproc];
        ready_to[nproc] = 0;
        }
        ChanOutInt( (Ready[routes[curbuf[M_TO]]])[n_of_me],
            (int)(curbuf-1) );
        } } /* i/o protocol input process: */
        void p_input_p( Process *p, Channel *In, Channel *Out ) { /* In is Input, Out
is Ready: */
        unsigned buf[SIZHEAD+1+(512/sizeof(unsigned))];
        unsigned *curbuf;
        int leng;
        p = p; /***/
        buf[0] = 0;
        leng = 0;
        while( 1 )
        {
        curbuf = buf;
        while ( curbuf[0] ) ProcReschedule();
        curbuf[0] = MESSAGE_TO_LINK; curbuf++;
        ChanIn( In, &leng, 2 );
        curbuf[M_TO] = server_number;
        curbuf[M_FROM] = my_number;
        curbuf[M_LENGTH] = leng;
        ChanIn( In, curbuf+SIZHEAD, leng );
        ChanOutInt( Out, (int)(curbuf-1) );
        } } /* output process: */
        void p_output( Process *p, Channel **In, Channel *Out ) { /* In is Go, Out is
Output: */
        unsigned *buf, *curbuf;
        unsigned char *tosend;
        int m, n, leng, from, to, stages, k;
```

58

```
p = p; /***/
while ( 1 )
{
k = ProcAltList( In );
buf = (unsigned*)ChanInInt( In[k] );
curbuf = buf+1;
leng = curbuf[M_LENGTH];
from = curbuf[M_FROM];
to = curbuf[M_TO]; /* message is never to me, it should be output: */ /* see
if it is from me & non-trivial: */
        if ( leng )
        {
        if ( buf[0] == MESSAGE_TO_LINK )
        { /* message from the internal buffer, just output: */
        ChanOut( Out, curbuf, SIZHEAD*sizeof( *curbuf ) );
        ChanOut( Out, curbuf+SIZHEAD, leng );
        }
        else
        { /* message from the user buffer, it may be too long to send, slice: */
        stages = curbuf[M_STAGES];
        curbuf[M_STAGES] = 0;
        tosend = (unsigned char*)(curbuf[SIZHEAD]); /* make the package standard
length: */
        if ( stages < 2 )
        n = leng;
        else
        { /* stages number of stages (given)  leng message length (given)  n slice
length (should be computed here) */ /*  Here we just primitively slice the message
into the number of   packages equal to the number of hops. Yes, this is not good.
The better formulae may be derived for the ideal slice length,   including k, n and b
from the functional requirement number 4   in 2.2. But mind, the formula should
not be so complicated that    its calculation takes all the time saved by optimal
slicing!!!   (Courtesy of Dr. L. A. Pozdniakov, IAM RAS, Moscow, Russia */
        n = leng / stages;
        if  ( n > SIZPACK )
        n = SIZPACK;
        else if ( n < SIZPACK_MIN )
        n = SIZPACK_MIN;
        } /* send: */
        while ( leng )
        {
        if ( leng > n )
        m = n;
        else
```

```
        m = leng;
        curbuf[M_LENGTH] = m;
        ChanOut( Out, curbuf, SIZHEAD*sizeof( *curbuf ) );
        ChanOut( Out, tosend, m );
        tosend += m; leng -= m;
        l_done_w[to] +=m;
      }
     }
    }
    else
     ChanOut( Out, curbuf, SIZHEAD*sizeof( *curbuf ) );
     buf[0] = 0;
 } } /* link channel processes: */
    Process *reader[10], *writer[10], *outputter; /***/ /* CreateChannels: */ static
Channel ** CreateChannels (Channel *OldChannels[],
             int ChannelsSize, int extra) {   Channel **NewChannels = NULL;
/***/   NewChannels = malloc((ChannelsSize + extra + 1) * sizeof(Channel *));   if (
NewChannels == NULL )
     abort(); else {
     int ChannelsCount = 0; /***/
     while (ChannelsCount++ < ChannelsSize)
       NewChannels[ChannelsCount 1] = OldChannels[ChannelsCount 1];
     NewChannels[ChannelsSize+extra] = NULL;   }   return(NewChannels); }
/***/
     int main() {
     int k, l; /***/
     set_abort_action(ABORT_HALT); /* import the link channels, the processor
number, etc: */
        HostInput = get_param(1);
        HostOutput = get_param(2);
        Size = *((int *) get_param(5));
        Input = CreateChannels(get_param(3), Size, 2);
        Output = CreateChannels(get_param(4), Size, 2);
        Input[Size] = get_param(6);
        Output[Size] = get_param(7);
        ind_prot = Size; Size++;
        Input[Size] = get_param(8);
        Output[Size] = get_param(9);
        ind_route = Size; Size++;
        routes = get_param(10);
        my_number = *((int *) get_param(11));
        server_number = *((int *) get_param(12));
        useraddr = malloc( (server_number+1)*sizeof( *useraddr ) );
        if ( useraddr == NULL )
```

```
{ /*    printf( "Can't allocate\n" ); */
abort();
}
l_reqd = malloc( (server_number+1)*sizeof( *l_reqd ) );
if ( l_reqd == NULL )
{ /*    printf( "Can't allocate\n" ); */
abort();
}
l_done = malloc( (server_number+1)*sizeof( *l_done ) );
if ( l_done == NULL )
{ /*    printf( "Can't allocate\n" ); */
abort();
}
l_reqd_w = malloc( (server_number+1)*sizeof( *l_reqd_w ) );
if ( l_reqd_w == NULL )
{ /*    printf( "Can't allocate\n" ); */
abort();
}
l_done_w = malloc( (server_number+1)*sizeof( *l_done_w ) );
if ( l_done_w == NULL )
{ /*    printf( "Can't allocate\n" ); */
abort();
}
ready_to = malloc( (server_number+1)*sizeof( *ready_to ) );
if ( ready_to == NULL )
{ /*    printf( "Can't allocate\n" ); */
abort();
} /* import done */
for ( k = 0; k <= server_number; k++ )
{
useraddr[k] = NULL;
l_reqd[k] = l_done[k]
= l_reqd_w[k] = l_done_w[k] = ready_to[k] = 0;
}
for ( k = 0; k < Size; k++ )
{ /* make writer channel array: */
Ready[k] = (Channel**)malloc( (Size+1)*sizeof(Channel*) );
for ( l = 0; l < Size; l++ )
{
(Ready[k])[l] = ChanAlloc();
if ( (Ready[k])[l] == NULL ) abort();
}
(Ready[k])[Size] = NULL;
}
```

61

```
for ( k = 0; k < Size; k++ )
 {
 if   ( k == ind_prot )
  {
  if ( (reader[k] = ProcAlloc( p_input_p, 0, 2,
       Input[k],
        (Ready[routes[server_number]])[k] )) == NULL )
   { /*     printf( "Can't allocate\n" ); */
   abort();
   }
  else
   {
   ProcRun( reader[k] );
   } /* writer does not exist for protocol link: */
  goto done;
  }
 else if ( k == ind_route )
  {
  if ( (reader[k] = ProcAlloc( p_input_u, 0, 2,
       Input[k], k )) == NULL )
   { /*     printf( "Can't allocate\n" ); */
   abort();
   }
  else
   {
   ProcRun( reader[k] );
   } /* writer does not exist for user link as well: */
  goto done;
  }
 else
  {
  if ( (reader[k] = ProcAlloc( p_input, 0, 2,
       Input[k], k )) == NULL )
   { /*     printf( "Can't allocate\n" ); */
   abort();
   }
  else
   {
   ProcRun( reader[k] );
   }
  }
 if ( (writer[k] = ProcAlloc( p_output, 0, 2,
      Ready[k], Output[k] )) == NULL )
  { /*     printf( "Can't allocate\n" ); */
```

```
  abort();
  }
 else
 {
  ProcRun( writer[k] );
  } done:;
 }
if ( (outputter = ProcAlloc( flags_out, 0, 0 )) == NULL )
 { /*    printf( "Can't allocate\n" ); */
  abort();
 }
else
{
 ProcRun( outputter );
}
ProcStop(); }
```

APPENDIX A-3

/* router.h:          */ /* the standard packet size: */ #define SIZPACK 512 /* the minimum packet size: */ #define SIZPACK_MIN 40 /* special index values for the package head: */ #define M_LENGTH 0 #define M_TO 1 #define M_FROM 2 #define M_STAGES 3 #define SIZHEAD 4 #ifndef SERVER /* data passed to user process from router when it starts: */ /* user receive addresses for respective processors: */ static unsigned char **useraddr; /* required & done lengths for receive: */
    static unsigned *l_reqd, *l_done; /* the same for send: */
    static unsigned *l_reqd_w, *l_done_w; /* user ready_to_receive flags, with # of stages values: */
    static unsigned *ready_to; #endif /* special tag values for server manipulations: */ #define GRAB_TAG 128 #define UNGRAB_TAG 129 #define VGABUF_TAG 130 #define FOPEN_TAG 10 #define FCLOSE_TAG 11 #define EXIT_TAG 35 /***/ /* end of router.h */

APPENDIX A- 4

/* routelib.c the functions to interface router services */ /* from within a user process. To compile and link with an */ /* application that uses the message-passing network: */ #include <stdlib.h> #include <string.h> #include <misc.h> #include <process.h> #include <stdio.h> /* a simple non-buffering message router interface: */ #include "router.h" /***/ /* the processor number: */

```
        unsigned my_number, server_number;
        int *routes;
        int *distance;
        static notinit = 1, is_grabbed = 0;
        static Channel *HostInput, *HostOutput, *In, *Out; /***/  /* initialize
routing: */
        int r_start() { /* import the link channels, the processor number, etc: */
        HostInput = get_param(1);
        HostOutput = get_param(2);
        In = get_param(3);
        Out = get_param(4);
        useraddr = (unsigned char**)ChanInInt( In );
        l_reqd = (unsigned*)ChanInInt( In );
        l_done = (unsigned*)ChanInInt( In );
        l_reqd_w = (unsigned*)ChanInInt( In );
        l_done_w = (unsigned*)ChanInInt( In );
        ready_to = (unsigned*)ChanInInt( In );
        my_number = (unsigned)ChanInInt( In );
        server_number = (unsigned)ChanInInt( In );
        notinit = 0;
        return( (int)my_number ); } /* grab/ungrab the server: */
        void grab_server() {
        int leng = 1, msg = GRAB_TAG; /***/
        if ( notinit | | is_grabbed ) return;
        ChanOut( HostOutput, &leng, 2 );
        ChanOut( HostOutput, &msg, 1 );
        ChanIn( HostInput, &leng, 2 );
        ChanIn( HostInput, &msg, leng );
        is_grabbed = 1; }
        void ungrab_server() {
        int leng = 1, msg = UNGRAB_TAG; /***/
        if ( notinit | | (!is_grabbed) ) return;
        ChanOut( HostOutput, &leng, 2 );
        ChanOut( HostOutput, &msg, 1 );
        is_grabbed = 0; } /* receive: */
        int r_read( nproc, buffer, length )
            int nproc; char *buffer; int length; {
```

65

```
        unsigned head[SIZHEAD]; /***/
        if ( (nproc == my_number) | | notinit
         | | (nproc >= server_number) | | (length <= 0) ) return( -1 );
        if ( l_reqd[nproc] != l_done[nproc] ) return( -2 );
        head[M_TO] = nproc;
        head[M_LENGTH] = 0;
        head[M_FROM]= my_number;
        useraddr[nproc] = (unsigned char*)buffer;
        l_reqd[nproc] = length;
        l_done[nproc] = 0;
        ChanOut( Out, head, SIZHEAD*sizeof( head[0] ) );
        return( 0 ); } /* test receive over: */
        int t_read( nproc )
            int nproc; {
        if ( (nproc == my_number) | | notinit
         | | (nproc >= server_number) ) return( 0 );
        if ( l_reqd[nproc] != l_done[nproc] ) return( 0 ); else return( 1 ); } /* wait for
the receive over: */
        int w_read( nproc )
            int nproc; {
        if ( (nproc == my_number) | | notinit
         | | (nproc >= server_number) ) return( 0 );
        while ( l_reqd[nproc] != l_done[nproc] ) ProcReschedule();
        return( 1 ); } /* send: */
        int r_write( nproc, buffer, length )
            int nproc; char *buffer; int length; {
        unsigned head[SIZHEAD]; /***/
        if ( (nproc == my_number) | | notinit
         | | (nproc >= server_number) | | (length <= 0) ) return( -1 );
        if ( l_reqd_w[nproc] != l_done_w[nproc] ) return( -2 );
        while ( !ready_to[nproc] ) ProcReschedule();
        head[M_TO] = nproc;
        head[M_FROM] = my_number;
        head[M_LENGTH] = length;
        head[M_STAGES] = (unsigned)buffer;
        l_reqd_w[nproc] = length;
        l_done_w[nproc] = 0;
        ChanOut( Out, head, SIZHEAD*sizeof( head[0] ) );
        return( 0 ); } /* test send over: */
        int t_write( nproc )
            int nproc; {
        if ( (nproc == my_number) | | notinit
         | | (nproc >= server_number) ) return( 0 );
        if ( l_reqd_w[nproc] != l_done_w[nproc] ) return( 0 ); else return( 1 ); } /* wait
```

```
for the send over: */
        int w_write( nproc )
          int nproc; {
        if ( (nproc == my_number) || notinit
         || (nproc >= server_number) ) return( 0 );
        while ( l_reqd_w[nproc] != l_done_w[nproc] ) ProcReschedule();
        return( 1 ); } /* router starter: */
        extern int r_main( int, char**, char**, Channel**, int, Channel**, int );
        int main( int argc, char *argv[], char *envp[],
            Channel *in[], int inlen, Channel *out[], int outlen ) {
        my_number = r_start();
        printf( "Processor %d started OK\n", my_number );
        return( r_main( argc, argv, envp, in, inlen, out, outlen ) ); }
```

APPENDIX A- 5

/* router configuration for 4 nodes: */ val BootLink 0; val N_of_nodes 4; val RouteTableSize 5;

process (stacksize = 50K);

T425 (memory = 1M) Proc_1; T425 (memory = 1M) Proc_2; T425 (memory = 1M) Proc_3; T425 (memory = 1M) Proc_4;

/* Host link connection */ connect Proc_1.link[BootLink] to host; /* hardware connections: */ connect Proc_1.link[2] to Proc_2.link[1]; connect Proc_2.link[2] to Proc_3.link[1]; connect Proc_3.link[2] to Proc_4.link[1];

process(heapsize=50k,
    interface( input MuxInput, output MuxOutput,
        input In, output Out, int Total = N_of_nodes )) server;

process(heapsize=600k,
    interface( input MuxInput, output MuxOutput,
        input In, output Out )) user_1;

process(heapsize=600k,
    interface( input MuxInput, output MuxOutput,
        input In, output Out )) user_2;

process(heapsize=600k,
    interface( input MuxInput, output MuxOutput,
        input In, output Out )) user_3;

process(heapsize=600k,
    interface( input MuxInput, output MuxOutput,
        input In, output Out )) user_4;

process(heapsize=50k,
    interface( int DummyHostIn = 0, int DummyHostOut = 0, /* the next line should replace the previous for debugging. */ /* the channels should be multiplexed to host to make router */ /* printf-able: */ /*         input MuxInput, output MuxOutput, */
        input In[2], output Out[2],
        int Size=2,
        input ProtIn, output ProtOut,
        input RouteIn, output RouteOut,
        int routes[RouteTableSize] = { 0, 1, 1, 1, 0 },

```
                    int Node_number=0,
                    int Total = N_of_nodes )) router_1;

process(heapsize=50k,
        interface( int DummyHostIn = 0, int DummyHostOut = 0, /* the next line
should replace the previous for debugging. */ /* the channels should be
multiplexed to host to make router */ /* printf-able: */ /*       input MuxInput,
output MuxOutput, */
                    input In[2], output Out[2],
                    int Size=2,
                    input ProtIn, output ProtOut,
                    input RouteIn, output RouteOut,
                    int routes[RouteTableSize] = { 0, 0, 1, 1, 0 },
                    int Node_number=1,
                    int Total = N_of_nodes )) router_2;

process(heapsize=50k,
        interface( int DummyHostIn = 0, int DummyHostOut = 0, /* the next line
should replace the previous for debugging. */ /* the channels should be
multiplexed to host to make router */ /* printf-able: */ /*       input MuxInput,
output MuxOutput, */
                    input In[2], output Out[2],
                    int Size=2,
                    input ProtIn, output ProtOut,
                    input RouteIn, output RouteOut,
                    int routes[RouteTableSize] = { 0, 0, 0, 1, 0 },
                    int Node_number=2,
                    int Total = N_of_nodes )) router_3;

process(heapsize=50k,
        interface( int DummyHostIn = 0, int DummyHostOut = 0, /* the next line
should replace the previous for debugging. */ /* the channels should be
multiplexed to host to make router */ /* printf-able: */ /*       input MuxInput,
output MuxOutput, */
                    input In[1], output Out[1],
                    int Size=1,
                    input ProtIn, output ProtOut,
                    input RouteIn, output RouteOut,
                    int routes[RouteTableSize] = { 0, 0, 0, 0, 0 },
                    int Node_number=3,
                    int Total = N_of_nodes )) router_4;

input HostInput; output HostOutput;
```

69 connect HostOutput to server.MuxOutput; connect HostInput to server.MuxInput;

/* connect routers: */ connect server.Out to router_1.In[0]; connect server.In to router_1.Out[0]; /*/ connect router_1.Out[1] to router_2.In[0] by LinkAI12; connect router_1.In[1] to router_2.Out[0] by LinkAO12; /*/ connect router_2.Out[1] to router_3.In[0] by LinkAI23; connect router_2.In[1] to router_3.Out[0] by LinkAO23; /***/ connect router_3.Out[1] to router_4.In[0] by LinkAI34; connect router_3.In[1] to router_4.Out[0] by LinkAO34; /* connect drivers to routers: */ connect user_1.MuxOutput to router_1.ProtIn; connect user_1.MuxInput to router_1.ProtOut; connect user_1.Out to router_1.RouteIn; connect user_1.In to router_1.RouteOut; connect user_2.MuxOutput to router_2.ProtIn; connect user_2.MuxInput to router_2.ProtOut; connect user_2.Out to router_2.RouteIn; connect user_2.In to router_2.RouteOut; connect user_3.MuxOutput to router_3.ProtIn; connect user_3.MuxInput to router_3.ProtOut; connect user_3.Out to router_3.RouteIn; connect user_3.In to router_3.RouteOut; connect user_4.MuxOutput to router_4.ProtIn; connect user_4.MuxInput to router_4.ProtOut; connect user_4.Out to router_4.RouteIn; connect user_4.In to router_4.RouteOut;

/* Mapping description */ /***/ use "router.lku" for router_1; place router_1 on Proc_1;

use "router.lku" for router_2; place router_2 on Proc_2;

use "router.lku" for router_3; place router_3 on Proc_3;

use "router.lku" for router_4; place router_4 on Proc_4; /***/ use "server.lku" for server; place server on Proc_1;

use "tnet.lku" for user_1; place user_1 on Proc_1;

use "tnet.lku" for user_2; place user_2 on Proc_2;

use "tnet.lku" for user_3; place user_3 on Proc_3;

use "tnet.lku" for user_4; place user_4 on Proc_4;

70

APPENDIX A-6

```c
#include <stdio.h> #include <stdlib.h> #include <misc.h> #include "routelib.h"
    int SIZMES;
    static int *buffers[1000];
    int r_main( argc, argv)
        int argc; char **argv; {
    int total, i, j, k, times, toterr = 0; /***/
    if ( argc != 3 )
    {
      printf( "Usage: iserver /sb <this_file.btl> size_of_mes times\n" );
      exit_terminate(0);
    }
     total = server_number;
    SIZMES = (int)(atol(argv[1]));
    times = (int)(atol(argv[2]));
    printf( "Message size is %d\n", SIZMES );
    for ( i = 0; i < total; i++ )
    {
     if ( (buffers[i] = malloc( SIZMES*sizeof( int ) )) == NULL )
     {
       printf( "No memory\n" );
       exit_terminate( 0 );
     }
    }
     printf( "Hellow, I am %s, #%d Total %d\n",
         argv[0], my_number, total );
     printf( "Running all routes %d times\n", times );
    while ( times-)
    {
     for ( i = 0; i < total; i++ )
     {
      if ( i != my_number )
      {
       for ( k = 0; k < SIZMES; k++ ) (buffers[i])[k] = -1;
       r_read( i, buffers[i], SIZMES*sizeof( int ) );
      }
     }
     j = 0;
     for ( k = 0; k < SIZMES; k++ )
     (buffers[my_number])[k] = my_number + k;
     for ( i = 0; i < total; i++ )
     {
      if ( i != my_number )
```

71

```
      {
        r_write( i, buffers[my_number], SIZMES*sizeof( int ) );
        w_write( i );
      }
    }
    for ( i = 0; i < total; i++ )
    {
      if ( i != my_number )
      {
        w_read( i );
        for ( k = 0; k < SIZMES; k++ )
        {
          if ( (buffers[i])[k] != (i+k) )
          {
            printf( "Processor %d received %d instead of %d from %d\n",
               my_number, (buffers[i])[k], i+k, i );
            j++;
          }
        }
      }
    }
    printf( "Processor %d received from all with %d errors\n",
        my_number, j );
    toterr += j;
  }
  printf( "Total errors: %d\n", toterr );
  exit_terminate( 0 ); }
This file #includes routelib.h. Here it is /* the router library interface: */ /***/
    extern int r_read( int /*proc*/, void* /*buffer*/, int /*length*/ );
    extern int t_read( int /*proc*/ );
    extern int w_read( int /*proc*/ );
    extern int r_write( int /*proc*/, void* /*buffer*/, int /*length*/ );
    extern int t_write( int /*proc*/ );
    extern int w_write( int /*proc*/ );
    extern void grab_server( void );
    extern void ungrab_server( void );
    extern int my_number, server_number; /***/
```

APPENDIX A-7

If the number of the lowest reliefs encountered was greater 1 it means there are few links with lowest relief for node S. For every link M with m_relief[S][M]=1 count two numbers:

c_count_link total number of nodes for which relief is lowest with link M (i.e. m_relief[i][M]=1) c_select   total number of nodes (except node S) for which relief
          is lowest with link M according to "real" router's           route table (i.e. routes[i]=M).

Select link with minimal c_select. If there are few such links choose one with highest c_count_link. Write its number to "real" router's route table for node S and make retranslation.

```
int count_link = VERY_FAR, c_count_link, select=0, c_select, ii; for ( i= 0; i < NetSize; i++ ) {  if (m_routes[from][i] == 1) /* Link the one of the lowest relief */
       {
       c_count_link = 0;
       c_select = 0;
       for (ii = 0; ii < server_number+1; ii++)
       {
        c_select =+ m_routes[ii][i]
        if ( routes[ii] == i && ii != from)
        c_count_link ++ ;
       }
       if (c_count_link<count_link              || (c_count_link==count_link && c_select>select))
       {
        count_link = c_count_link;
        routes[from] = i;
        select = c_select;
        send = 1;
       }
       } }
```

We claim:

1. A method of controlling communications among a plurality of user processes executing in a multiple instruction, utilizing arbitrary one level topology multiple data (MIMD) parallel processing computer system having a number (N) of processing nodes, all of which are interconnected, to form a network, by a set of transfer links into a message passing network via which one user process may communicate a message of arbitrary length to another user process identified by a destination node number, the method comprising the computer-implemented steps of:

(a) during compilation of each user process performing the steps of:
  (a1) creating a unique software router process that will execute on the same processing node as the user process;
  (a2) connecting each user process and its' associated router process by defining in the memory of the processing node at least one communication channel between the user process and the associated router process; and
  (a3) for each router process, defining in the memory of the processing node an array of N-1 transfer channels, each of which is correlated to the set of transfer links of the processing node, and creating a routing table in the memory of the processing node unique to that processing node for mapping a destination node number to a particular transfer channel; and (b) during execution of the user processes, passing messages within the message passing network by having a routing process at each processing node route messages received by the processing node in response to a destination node number contained in a message and the routing table unique to that processing node.

2. The method of claim 1 wherein the processing nodes are physically connected within the message passing network as structured in one of a grid and irregular connection arrangement and wherein the routing table created in step (a3) accommodates the connection arrangement.

3. The method of claim 1 where step (b) routes the messages according to a routing scheme selected from the set comprising:
  wormhole routing; and
  store and forward routing;
  wherein said wormhole and said store and forward routing being one of oblivious and adaptive type.

4. The method of claim 1 wherein step (b) routes messages in accordance with a software channel protocol such that each transfer channel defined in step (a3) is independent of all other transfer channels for a routing process and each transfer channel is either free or busy such that no queues are used for messages to be transmitted on a given transfer channel and wherein any pair of adjacent processes is connected by one and only one channel.

5. The method of claim 4 wherein a message includes a length value for the message and wherein a channel transfer is asynchronous with respect to an end of the channel transfer.

6. The method of claim 4 wherein the channel protocol for step (b) includes six control primitives which may be issued by the routing process including the software based operations: start read, start write, query read over for a given channel, query write over for a given channel, wait for read over for a given channel, wait for write over for a given channel.

7. The method of claim 1 wherein the software based router process created in step (a) is comprised of N sub-processes executing on the processing node and wherein each sub-process performs the store and forward routing of step (b) for messages sent to or received from a unique one of the processing nodes in the message passing network.

8. The method of claim 7 wherein each sub-process is provided with a unique subset of buffers defined in the memory of the processing node, including a first set of buffers in the memory of the processing node accessible to both the user process and the router process and a second set of intermediate buffers accessible only to the router process and wherein the router process in step (b) uses the first set of buffers for writing messages if the user process initiates the message and for reading messages if the destination node number contained in the message matches a node number of the processing node, and uses the second set of intermediate buffers for all other messages.

9. The method of claim 7 wherein each sub-process utilizes buffers in a common buffer pool defined in the memory of the processing node, the common buffer pool including a first set of buffers in the memory of the processing node accessible to both the user process and the router process and a second set of intermediate buffers accessible only to the router process and wherein the router process in step (b) uses the first set of buffers for writing messages if the user process initiates the message and for reading messages if the destination node number contained in the message matches a node number of the processing node, and uses the second set of intermediate buffers for all other messages.

10. The method of claim 9 wherein step (b) further comprises the step of assigning buffers from the common buffer pool to sub-processes by structuring the common buffer pool so as to have buffers allocated for particular transfer links.

11. The method of claim 10 wherein message passing in step (b) is deadlock-free always by implementing store and forward oblivious routing method.

12. The method of claim 9 wherein step (b) further comprises the steps of:
  (b1) assigning buffers from the common buffer pool to sub-processes by structuring the common buffer pool so as to have buffers allocated based on a number of hops;
  (b2) determining a number of hops between directly connected processing nodes which a given message travels in the message passing network; and
  (b3) selecting a buffer for the routing process based on the number of hops determined in step (b2).

13. The method of claim 12 wherein step (b3) is accomplished by performing the steps of:
  (b31) subdividing the buffers in the common buffer pool into classes, with at least one buffer in each class and with there being at least as many classes as a longest number of hops between processing nodes in the message passing network;
  (b32) determining a number of hops which a message travels in the message passing network and assigning that number as a class of the message within that routing process; and
  (b33) letting the message occupy only buffers in the common buffer pool having a class less than or equal to the class of the message.

14. The method of claim 13 wherein the number of hops which a message travels as determined by step (b32) is selected from the set comprising: a number of hops which the message has remaining before delivery to an intended processing node.

15. The method of claim 9 wherein the store and forward routing of step (b) divides messages from user processes into a plurality of packages and interleaves the packages from one message with the packages from another message.

16. The method of claim 15 wherein step (b) further comprises the step of assigning buffers from the common buffer pool to sub-processes by performing the steps of:

(b1) structuring buffers allocated from the common buffer pool so as to have unique buffers allocated for particular transfer links;

(b2) allocating the unique buffers for particular transfer links based on a number of hops between directly connected processing nodes which a given package travels in the message passing network;

(b3) advising any directly connected processing nodes whether there is a destination buffer available for that particular message; and (b4) writing a whole message not divided into packages, to a directly connected destination node only when a destination buffer exists.

17. The method of claim 1 wherein consumption of a message from an initiating node to a destination node is guaranteed by performing the additional step of:

(c) determining the existence of an available buffer in the destination node into which the message is to be read prior to initiating transfer of the message across the message network.

18. The method of claim 1 wherein duplicate transfers of messages within a processing node are avoided by defining a first set of buffers in the memory of the processing node accessible to both the user process and the router process and a second set of intermediate buffers accessible only to the router process and wherein the router process in step (b) uses the first set of buffers for writing messages if the user process initiates the message and for reading messages if the destination node number contained in the message matches a node number of the processing node, and uses the second set of intermediate buffers for all other messages.

19. The method of claim 1 wherein step (a2) defines at least two communication channels between the user process and the associated router process, a message passing channel and an input/output channel, wherein at least one processing node in the message passage network is designated as an input/output server and wherein the router process in step (b) passes messages from the input/output channel to the input/output server so as to emulate a direct connection of each processing node to the input/output server.

20. The method of claim 19 wherein the input/output server is never intermediate for any transfer of messages in the message passing network in step (b).

21. The method of claim 1 wherein step (a3) includes the step of initiating a self-configuration process on each node to automatically generate the routing table.

* * * * *